United States Patent
Cheon

(10) Patent No.: US 11,764,418 B2
(45) Date of Patent: Sep. 19, 2023

(54) COOLANT RESERVOIR AND CIRCULATION ASSEMBLIES AND SYSTEMS

(71) Applicant: Koolance, Inc., Auburn, WA (US)

(72) Inventor: Kioan Cheon, Auburn, WA (US)

(73) Assignee: Koolance, Inc., Auburn, WA (US)

( * ) Notice: Subject to any disclaimer, the term of this patent is extended or adjusted under 35 U.S.C. 154(b) by 194 days.

(21) Appl. No.: 17/141,955

(22) Filed: Jan. 5, 2021

(65) Prior Publication Data

US 2021/0210809 A1  Jul. 8, 2021

Related U.S. Application Data

(60) Provisional application No. 62/957,283, filed on Jan. 5, 2020.

(51) Int. Cl.
*H01M 10/613* (2014.01)

(52) U.S. Cl.
CPC .................. *H01M 10/613* (2015.04)

(58) Field of Classification Search
CPC ............. H01M 10/613; H01M 10/486; H01M 10/643; H01M 10/6567; H01M 50/213; H01M 50/289; H01M 10/6568; Y02E 60/10; B32B 15/08; B32B 15/085; B32B 15/095; B32B 15/20; B32B 2439/46
See application file for complete search history.

(56) References Cited

U.S. PATENT DOCUMENTS

| | | | |
|---|---|---|---|
| 9,673,495 B2 * | 6/2017 | Lee | H01M 10/6567 |
| 2013/0011701 A1 | 1/2013 | Petzinger | |
| 2016/0254577 A1 | 9/2016 | Ciampolini et al. | |
| 2017/0047616 A1 | 2/2017 | Takahata | |
| 2017/0194681 A1 * | 7/2017 | Kim | H01M 50/271 |
| 2017/0279172 A1 | 9/2017 | Tucker | |
| 2017/0358783 A1 | 12/2017 | Kim | |
| 2018/0175340 A1 | 6/2018 | Karulkar et al. | |
| 2019/0077276 A1 | 3/2019 | Capati et al. | |

FOREIGN PATENT DOCUMENTS

| | | | | |
|---|---|---|---|---|
| CN | 209029504 U | * | 6/2019 | .......... H01M 10/482 |
| DE | 102017130261 A1 | * | 6/2018 | .............. B60K 1/04 |
| GB | 2502977 A | * | 12/2013 | ........ H01M 10/5016 |
| WO | WO-2019026676 A1 | * | 2/2019 | .......... H01M 10/613 |

OTHER PUBLICATIONS

International Search Report and Written Opinion of International Application No. PCT/US2021/012217, dated Mar. 19, 2021. (10 pages).
International Preliminary Report on Patentability; International Search Report and Written Opinion of International Application No. PCT/US2021/012217, dated Jul. 5, 2022, (8 pages).

* cited by examiner

*Primary Examiner* — Kaity V Chandler
(74) *Attorney, Agent, or Firm* — SEED INTELLECTUAL PROPERTY LAW GROUP LLP

(57) ABSTRACT

A battery coolant reservoir assembly can include an exterior structure having an interior surface defining an interior space, a flexible coolant retaining pouch coupled to a manifold, and a battery module disposed within the coolant retaining pouch. The coolant retaining pouch can be disposed in the interior space of the exterior structure. Related systems and methods are also provided.

13 Claims, 34 Drawing Sheets

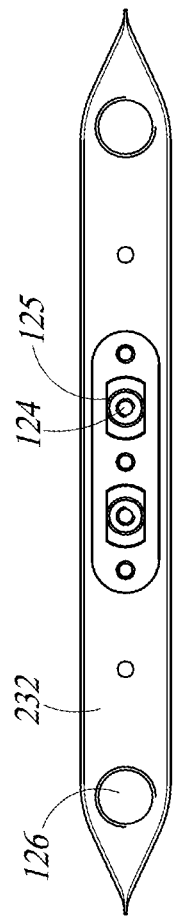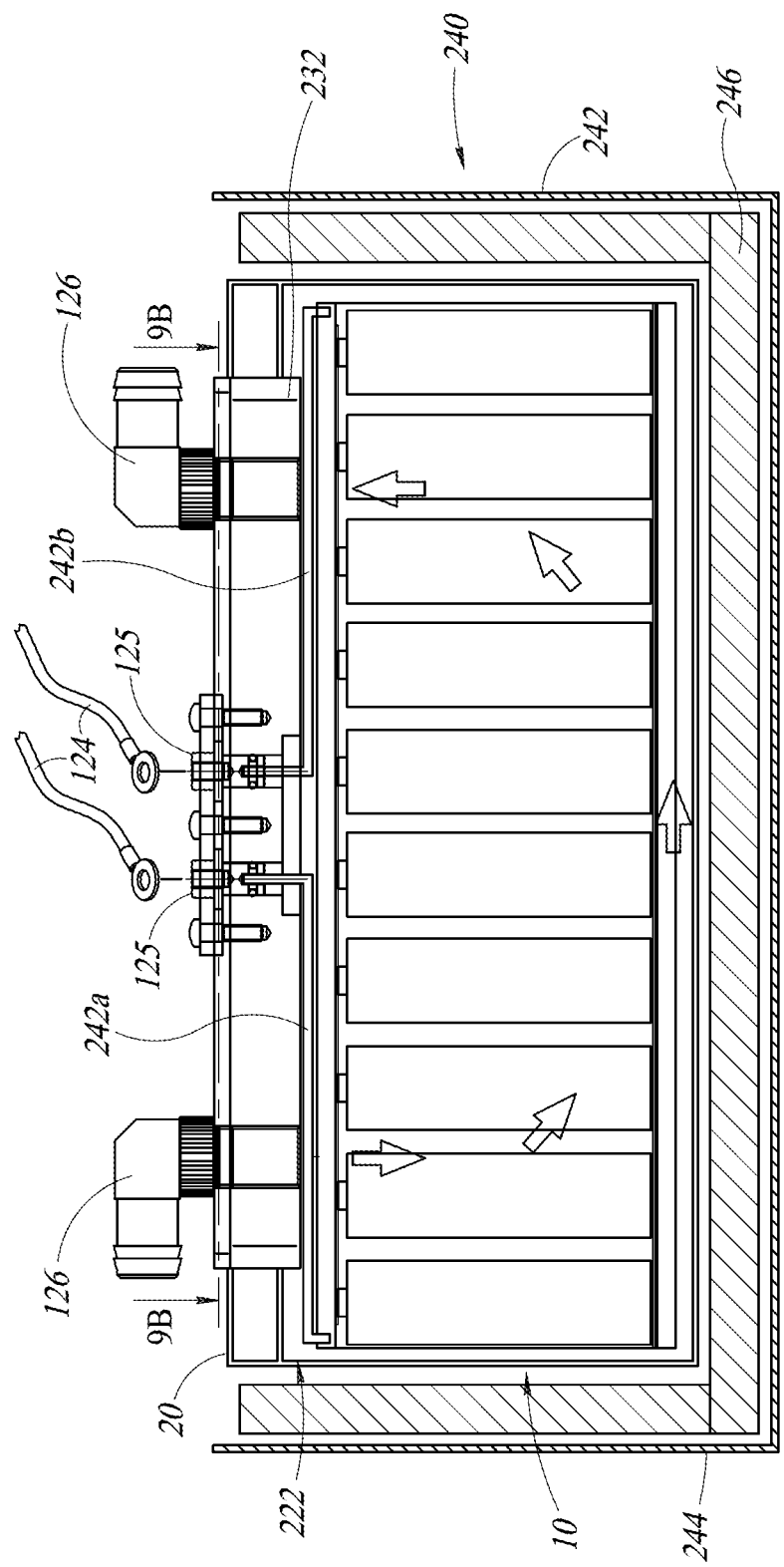

COOLANT RESERVOIR AND CIRCULATION ASSEMBLIES AND SYSTEMS

BACKGROUND

Technical Field

The present disclosure relates to thermal systems, and more particularly, to temperature regulating systems using flexible pouch enclosures, for electronic devices such as batteries.

Description of the Related Art

High storage rechargeable batteries, such as Lithium-ion (Li-ion) batteries are generally sensitive to both high and low temperatures. In particular, when such batteries operate in extreme temperature conditions, it can impact the operational performance or reduce the operational life of such batteries, as well as in some cases, cause catastrophic events such as fires. Thus, the temperature range that a battery pact is exposed to needs to be carefully regulated in order to ensure optimal performance and life. It is also generally preferable to reduce uneven distribution of temperature through a battery pack, which could also reduce operational performance of the pack. By attaining even temperature distribution through a battery pack, performance may be improved and/or optimized, and the risk of potential hazards, such as fires, caused by excessive heat may be reduced. Battery fires may also be caused from physical damage or puncture of batteries.

In order to address these issues, one solution that has been developed is to use liquid coolant to both cool and heat such batteries as temperatures and loads require. This approach may involve submerging battery cells in the liquid coolant. For example, U.S. Patent Application Publication No. 2017/0279172 discloses an example of such a system. One example problem with such "temperature regulating" systems is that they may employ complex plastic (or metal) structures, which generally require an expensive tooling investment, to contain the submerged batteries and their liquid coolant. Manufacturing of such structures can be difficult, and the resulting structures can be somewhat limiting in terms of scalability.

BRIEF SUMMARY

Various embodiments and implementations described herein provide systems, methods, apparatuses that can cool electronic devices, such as batteries, with compact, efficient, and robust form factors. By way of example, a battery coolant reservoir assembly can include an exterior structure having an interior surface defining an interior space, a flexible coolant retaining pouch coupled to a manifold, and a battery module disposed within the coolant retaining pouch. The coolant retaining pouch can be disposed in the interior space of the exterior structure.

By way of further example, a battery system can include a battery containment structure defining an interior space, and a plurality of battery coolant reservoir assemblies disposed in the interior space of the battery containment structure. Each of the battery coolant reservoir assemblies can include an exterior structure having an interior surface which defines an interior space, and a flexible coolant retaining pouch holding one or more battery modules, the coolant retaining pouch being inserted in the interior space of the exterior structure, the coolant retraining pouch being coupled to a manifold having therein a plurality of ports for use in connection to coolant inlet and outlet lines. Further, the plurality of battery coolant reservoir assemblies can be interconnected via coolant connecting lines.

By way of further example, a method for making a coolant pouch can include providing a first multi-layer liner, providing a second multi-layer liner, laying the first multi-layer liner flat on top of the second multi-layer liner, and sealing at least some edges of the first multi-layer liner with edges of the second multi-layer liner.

DESCRIPTION OF THE SEVERAL VIEWS OF THE DRAWINGS

FIG. 9A is a cross-sectional view of an example battery coolant reservoir assembly according to an example embodiment of the present disclosure.

FIG. 9B is a cross-sectional view of the example battery coolant reservoir assembly of FIG. 9A, taken along line 9B-9B.

DETAILED DESCRIPTION

Figure 1A:
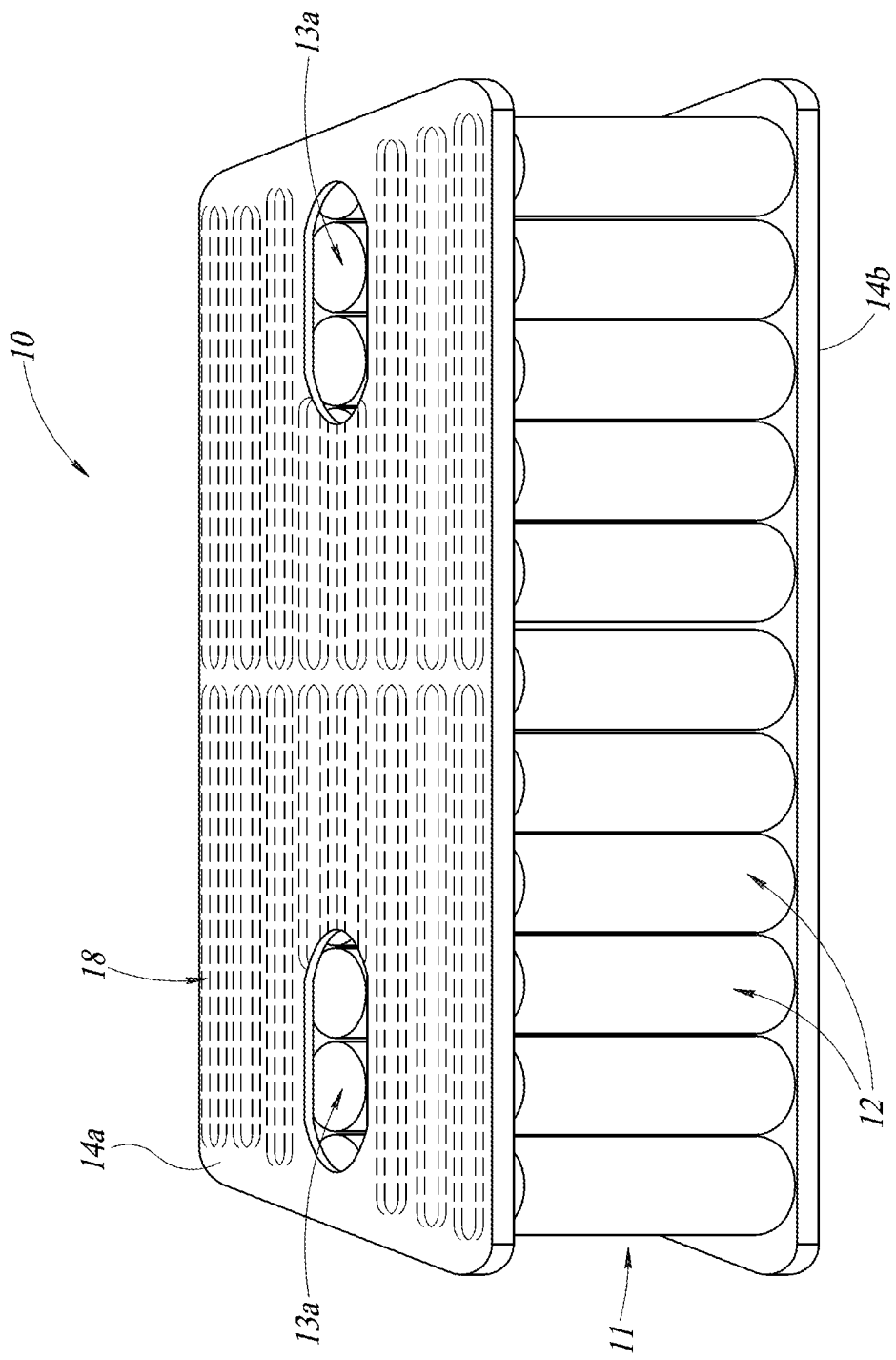
FIG. 1A illustrates an example battery module, according to an example embodiment of the present disclosure.

In the present description, certain specific details are set forth in order to provide a thorough understanding of various embodiments of the disclosure. However, upon reviewing this disclosure one skilled in the art will understand that the various embodiments disclosed herein may be practiced without many of these details. In other instances, some well-known structures and materials of construction have not been described in detail to avoid unnecessarily obscuring the descriptions of the embodiments of the disclosure.

In the present disclosure, to the extent the terms "about" and "approximately," are used, they mean±20% of the indicated range, value, or structure, unless otherwise indicated. In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, the terms and variants of which are intended to be construed as non-limiting. The definitions in this paragraph are intended to apply throughout this disclosure unless otherwise expressly stated.

Various embodiments in this disclosure are described with respect to Lithium-Ion (Li-Ion) batteries. However, and as will be understood by those of ordinary skill in the art after reviewing this disclosure, the disclosed embodiments may be suitable for use in other environments including environments where other types of batteries or other types of electronic devices may be exposed to extreme and/or fluctuating thermal conditions.

According to various embodiments of the present disclosure coolant reservoir and circulation assemblies and systems are provided that includes a flexible pouch for submerging, in a coolant, electronic components such as batteries. In particular, in some embodiments, the flexible pouch may be employed to hold a coolant liquid and to submerge battery cells in the coolant liquid, such as a dielectric liquid. Submerging battery cells in such fluids may provide more consistent temperature control throughout the battery cells. Further, submerging battery cells in a dielectric liquid may provide the additional benefit of flame suppression if the battery is punctured or a fire begins elsewhere. In various embodiments, employing a flexible pouch for holding the coolant may minimize the large tooling investments associated with the complex structures employed by convention battery temperature regulating systems.

In accordance with various embodiments, the battery coolant reservoir assemblies and systems are simple to manufacture, cost effective to produce, and highly scalable. As will be further described herein, the battery coolant reservoir assembly may include a coolant retaining pouch that can hold a liquid coolant, one or more battery packs that may comprise of a plurality of battery cells and current collectors, top and bottom coolant channeling panels that may be placed on top of and at the bottom of the one or more battery packs held by the pouch, and a case with at least a solid exterior structure for holding the coolant retaining pouch and its contents (e.g., one or more battery packs, top and bottom current collectors, top and bottom coolant channeling panels, and liquid coolant) and cushioning material disposed on the interior side of the exterior structure placed between the interior side of the exterior structure and the coolant retaining pouch as will be further shown and described herein.

FIG. 1A illustrates a battery module 10 according to an example embodiment. The battery module 10 may include a battery pack 11 and top and bottom coolant channeling panels 14a and 14b. In some embodiments, as shown in FIG. 7, the battery module 10 may include top and bottom current collectors 16a and 16b, which provide current/electrical paths from battery cells (e.g., battery cells 12) to battery wiring in accordance with some embodiments. The battery pack 11 includes a plurality of battery cells 12. In various embodiments, the battery cells 12 may be Li-ion battery cells. On top of the battery cells 12 is a top coolant channeling panel 14a and under the battery cells 12 is a bottom coolant channeling panel 14b. Although not visible in FIG. 1, as shown in FIG. 4B, disposed between the battery cells 12 and the top coolant channeling panel 14a is a top current collector 16a and between the battery cells 12 and the bottom coolant channeling panel 14b is a bottom current collector 16b for conductively coupling the battery cells 12 to, for example, battery wirings. In various embodiments, the top current collector 16a and the bottom current collector 16b may electrically couple the battery cells 12 to battery wires as will be further illustrated and described herein. Note that although the battery module 10 illustrated in FIG. 1 is shown as having numerous battery cells 12, in some alternative embodiments, a battery module 12 may include as few as two or three battery cells 12, while in other embodiments, a greater number of battery cells 12 may be included in the battery pack 11 than the number of battery cells illustrated in FIG. 1.

Figure 1B:
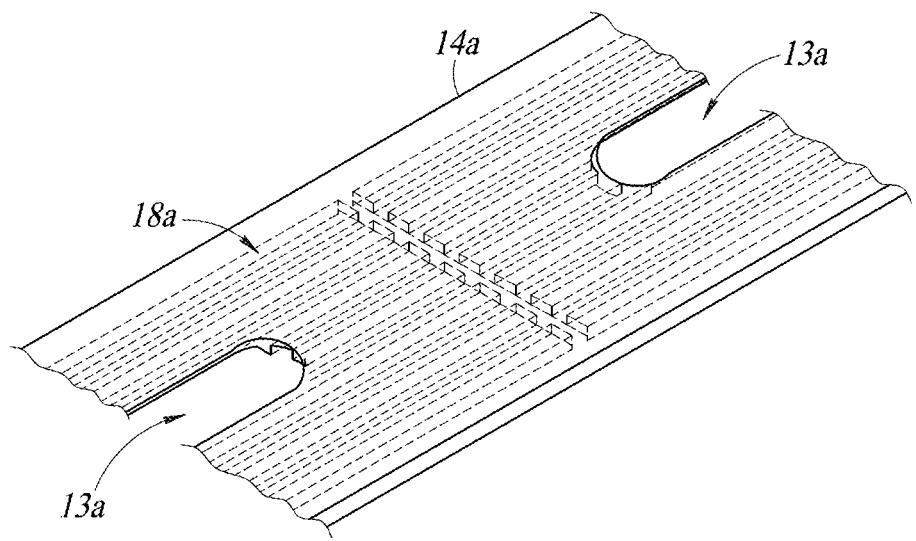
FIG. 1B illustrates a perspective view of a top coolant channeling panel of a battery coolant reservoir assembly according to an example embodiment of the present disclosure.
Figure 1C:
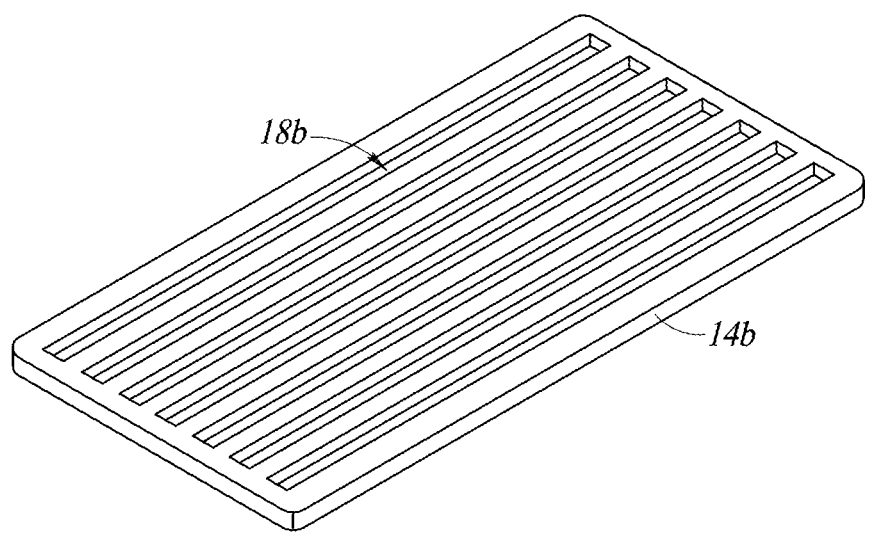
FIG. 1C illustrates a perspective view of a bottom coolant channeling panel of a battery coolant reservoir assembly according to an example embodiment of the present disclosure.

In various embodiments, the top coolant channeling panel 14a may include one or more coolant channels 18a to facilitate circulation of coolant that may submerse the battery module 10 as will be further described herein. Disposed in the coolant channels 18 are through holes that permit coolant flowing through the coolant channels 18a to circulate through the battery cells 12. The coolant channels 18a in FIG. 1A are illustrated as extending longitudinally on top of the top coolant channeling panel 14a. In alternative embodiments, however, the coolant channels 18a may extend laterally or diagonally. Similar to the top coolant channeling panel 14a, the bottom coolant channeling panel 14b may include one or more coolant channels 18b to facilitate the circulation of coolant. For example, FIGS. 1B and 1C illustrates example embodiments of the top coolant channeling panel 14a and bottom coolant channeling panel 14b, respectively. As shown in FIGS. 1A and 1B, in some embodiments, the top coolant channeling panel 14a may optionally include one or more slot apertures 13a. The slot apertures 13a may be sized and shaped to provide access to an interior of the battery module 10.

Figure 2:
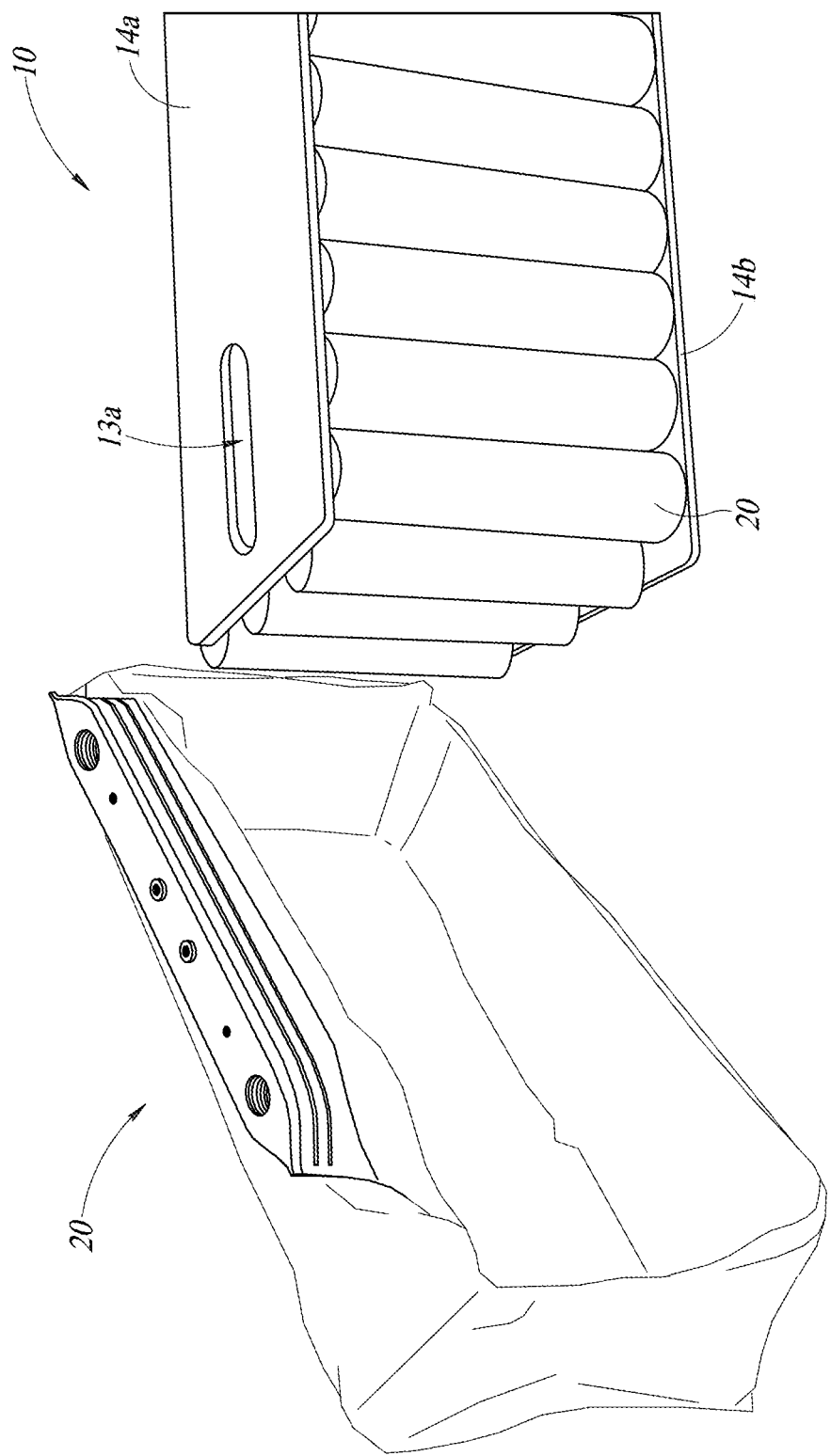
FIG. 2 illustrates a coolant retaining pouch according to an example embodiment of the present disclosure.

Referring now to FIG. 2, which illustrates a coolant retaining pouch (hereinafter "pouch 20") for holding one or more battery modules 10 and a liquid coolant in accordance with some example embodiments. In FIG. 2, the pouch 20 is open to receive at least one battery module 10. Depicted next to the pouch 20 is a battery module 10 that may be placed into the open pouch 20. In various embodiments, the pouch 20 may be a multi-layer vinyl bladder that is made of one or more flexible/elastic materials as will be further described herein. In some embodiments, the multi-layers that the pouch 20 may be comprise of, for example, a combination of a polyethylene (PET) sheet, a nylon sheet, an aluminum sheet, and a polyethylene PE sheet as will be further described herein.

Figure 3:
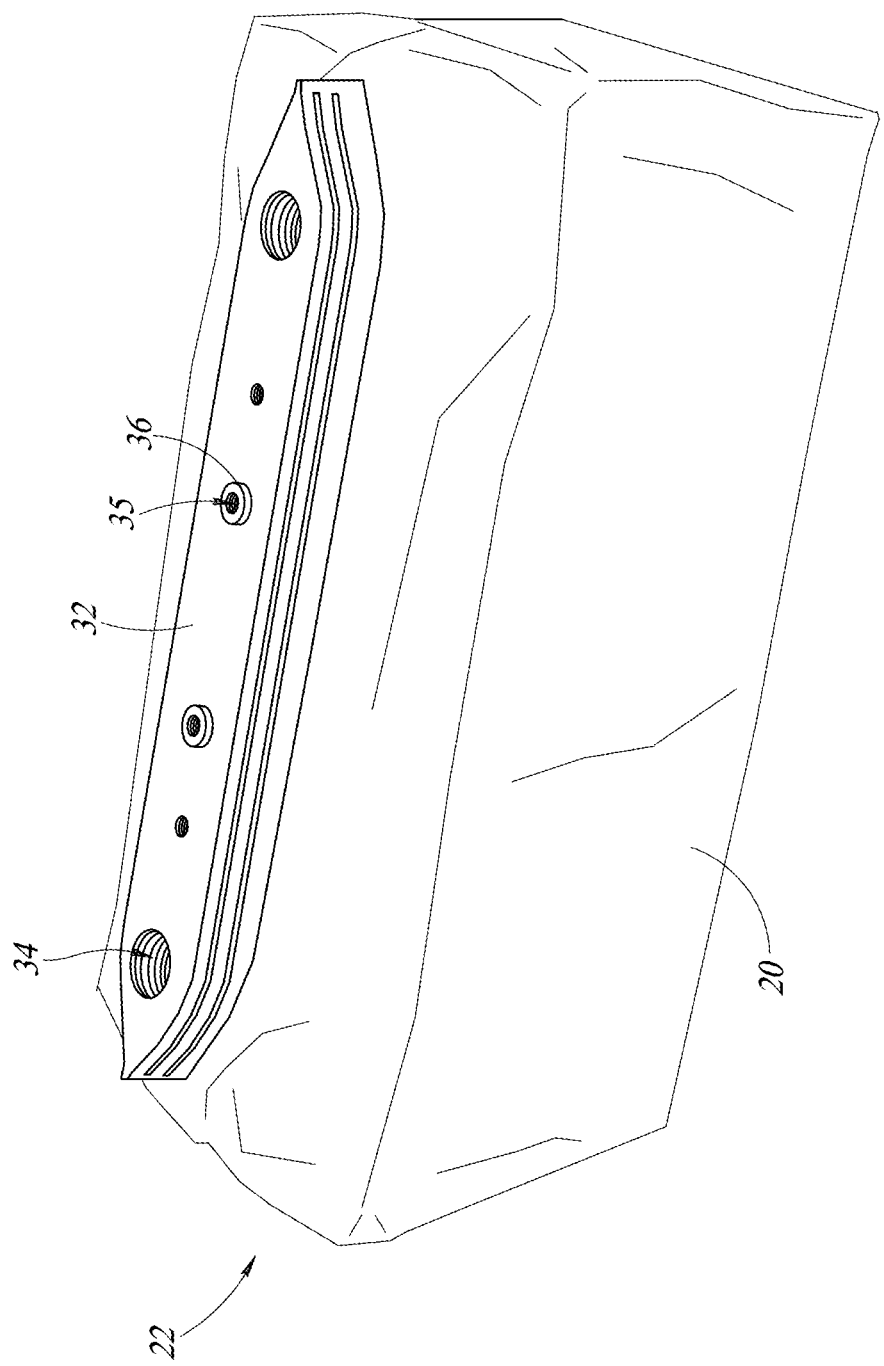
FIG. 3 illustrates a battery and coolant reservoir package according to one or more example embodiments of the present disclosure.

FIG. 3 illustrates a battery and coolant reservoir package 22 according to some embodiments. For these embodiments, the coolant reservoir package 22 may include the pouch 20 illustrated in FIGS. 1 and 2 that has been sealed and that encloses a battery module 10 (not shown for clarity of illustration and description). At the top of the pouch 20 is a coolant inlet/outlet manifold 32. Disposed in or on the coolant inlet/outlet manifold 32 are two ports 34 for connecting to, for example, coolant tube fittings 126 (see, e.g., FIGS. 4B, 6), which as will be further illustrated, may be L-shaped tubes in some cases. The coolant inlet/outlet manifold 32 may further include, one or more battery wiring ports 35 (see FIG. 4) through which one or more battery wires may pass through. The battery ports 35 are generally sized and shaped to coupleably receive a wiring connector 36. In various embodiments, the battery wires that may pass through the battery wiring ports 35 may be sealed to avoid coolant from leaking. In various embodiments, the coolant inlet/outlet manifold 32 may be made of a rigid or semi-rigid material such as a plastic or ceramic material. As described above, the one or more battery wiring ports 35 are configured to electrically couple the top current collector 16a and the bottom current collector 16b to battery wires received in the one or more battery wiring ports 35.

Figure 4A:
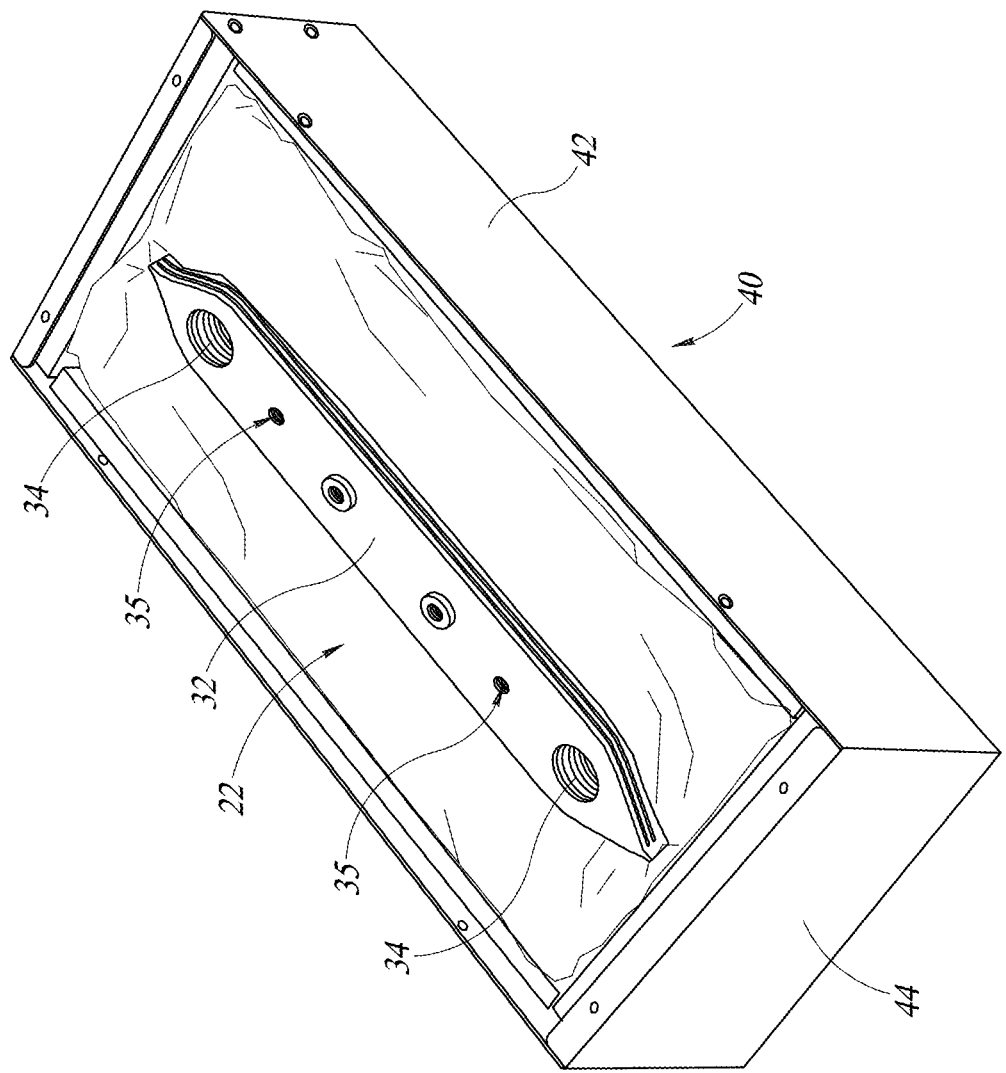
FIG. 4A illustrates an example battery coolant reservoir assembly according to an example embodiment of the present disclosure.
Figure 4B:
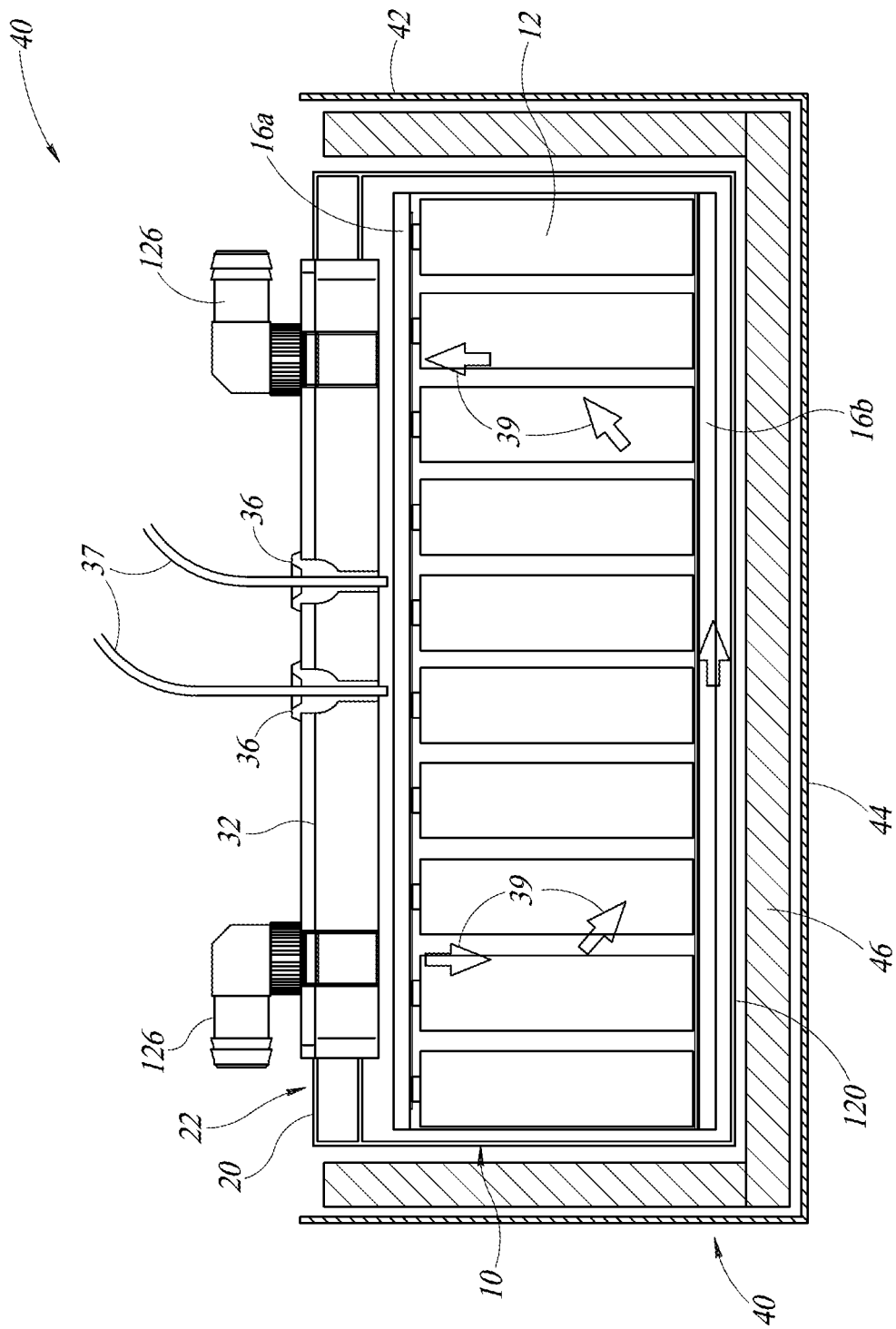
FIG. 4B illustrates a side cross-sectional view of the battery coolant reservoir assembly of FIG. 4A.

FIGS. 4A and 4B illustrate an example battery coolant reservoir assembly 40 in accordance with some example embodiments of the present disclosure. The battery coolant reservoir assembly 40 includes a case 42, and a battery and coolant reservoir package 22 (including one or more battery modules 10 disposed within the pouch 20—not shown). In various embodiments, as described in more detail herein, the case 42 may be comprised of a solid or supporting exterior structure 44, which may be made of a rigid or solid material such as a metal, rigid plastic, or a ceramic, fillers (e.g., fillers 890, 891), and vibration-dampening cushion material 46. As illustrated in FIG. 4, the exterior structure 44 in some embodiments may have a box or cuboid shape. Other shapes may be employed in some other alternative embodiments. The cushion material may or may not be detachable from the exterior structure 44 in various alternative embodiments. In various embodiments, the cushion material or the filler may be made of Ethylene-Vinyl Acetate (EVA) form, silicone, polyethylene (PE), and/or the like that is not too soft. In various embodiments, the cushion material or the filler may protect the flexible reservoir liner (which may be a multi-layer sheet) that forms the pouch 20 from abrasion, puncture, shock, and vibration from the exterior structure 44. The cushion material or the filler may also provide some insulation for temperature control purposes.

As illustrated in FIG. 4B, which is a side cross-sectional view of the battery coolant reservoir assembly 40, the case 42 defines an interior space within which the battery coolant reservoir assembly 40 is received. The case 42 includes the cushion material 46 that may be disposed on the interior surface of the exterior structure 44 and that may or may not be detachable from the exterior structure 44. Placed within the interior space of the case 42 and on the interior side of the cushion material 46 is the battery and coolant reservoir package 22, which includes the pouch 20 containing a battery module 10 that may correspond to the battery module 10 illustrated in FIG. 1. Although not illustrated in FIG. 4A, as illustrated in FIG. 4B, the coolant inlet/outlet manifold 32 includes two ports 34 for connecting to, for example, coolant tube fittings 126. Further, the coolant inlet/outlet manifold 32 includes battery wiring ports 35 through which one or more battery wires 37 pass through. The battery ports 35 are generally sized and shaped to coupleably receive a wiring connector 36. In various embodiments, the battery wires that may pass through the battery wiring ports 35 may be sealed to avoid coolant from leaking. In various embodiments, the coolant inlet/outlet manifold 32 may be made of a rigid or semi-rigid material such as a plastic or ceramic material. As described above, the one or more battery wiring ports 35 are configured to electrically couple the top current collector 16a and the bottom current collector 16b to battery wires received in the one or more battery wiring ports 35. Also illustrated in FIG. 4B is a direction of a coolant, indicated by arrow 39, that may flow through the interior space of the pouch 20 according to one implementation. As described above, on top and bottom of the battery cells 12 and in contact with terminals of the battery cells 12 are a top current collector 16a and a bottom current collector 16b, which in some embodiments may comprise of electrical wiring, tabs, and/or plates.

Figure 5A:
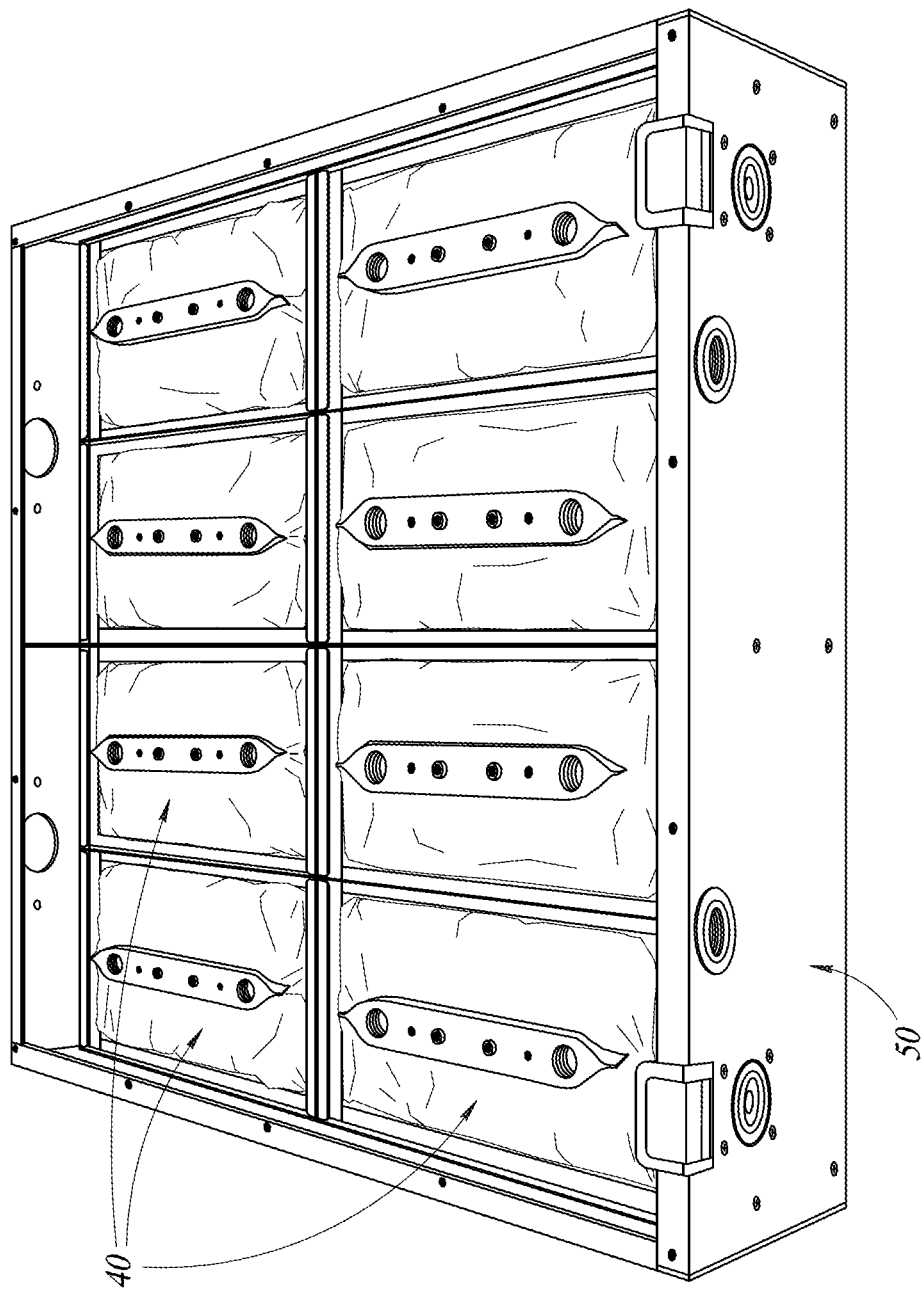
FIG. 5A illustrates a perspective view of an example battery containment structure according to an example embodiment of the present disclosure, with certain cover plates removed for clarity of description and illustration.

FIGS. 5A-5E illustrate an example battery containment structure 50 for holding a plurality of battery coolant reservoir assemblies 40. In various embodiments, the battery containment structure 50 may be wholly placed into, for example, an electric vehicle (EV), or other types of electrically powered machinery, for storing and discharging electrical power. As illustrated in FIG. 5A, in which certain components have been removed for clarity of illustration and description, and FIG. 5C, which is a is a side cross-sectional view of the battery containment structure 50 illustrating a pair of battery coolant reservoir assemblies 40, the battery containment structure 50 may include one or more compartments which are sized and shaped to receive the battery coolant reservoir assemblies 40. For example, the battery containment structure 50 in this embodiment includes eight compartments that are sized and shaped to receive eight battery coolant reservoir assemblies 50.

Figure 5B:
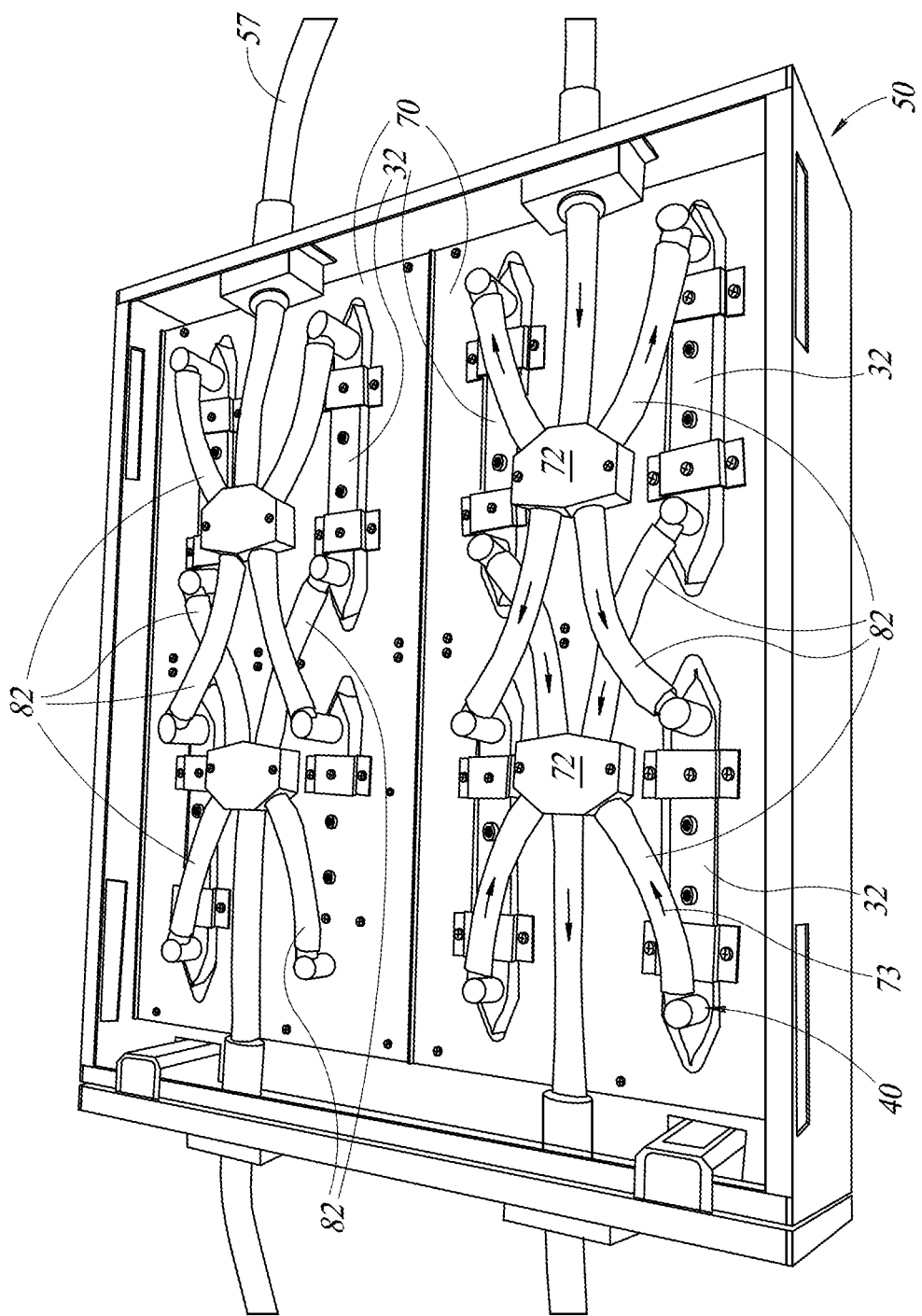
FIG. 5B illustrates the coolant reservoir assemblies of the battery containment structure illustrated in FIG. 5A being interconnected via coolant connecting lines of a tubing manifold according to an example embodiment of the present disclosure.
Figure 5C:
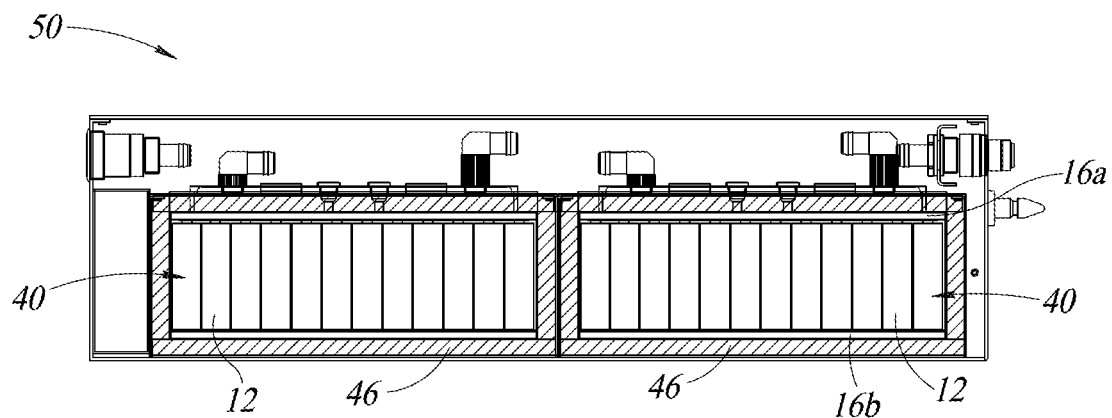
FIG. 5C illustrates a side cross-sectional view of the battery containment structure of FIG. 5A.

FIG. 5B shows the example battery containment structure 50 of FIG. 5A, including how the coolant reservoir assemblies 40 may be fluidly interconnected via coolant connecting lines 82 and tubing manifolds 72. Disposed on top of the coolant reservoir assemblies 40 are two plates 70. In the embodiment illustrated in FIGS. 5A and 5B there are eight coolant reservoir assemblies 40 in the battery containment structure 50 underneath the two plates 70 (note that there are eight coolant inlet/outlet manifolds 32 visible in FIG. 5B for the eight coolant reservoir assemblies 40). Underneath each plate 70 are four coolant reservoir assemblies 40 that are interconnected via coolant connecting lines 82 and tubing manifolds 72. As shown in FIG. 5B in reference to a set of four coolant reservoir assemblies 40, the coolant connecting lines 82 and tubing manifolds 72 facilitate coolant flow between the coolant reservoir assemblies 40 as indicated by arrows 73. In some embodiments, the coolant connecting lines 82 and tubing manifolds 72 can be interconnected to provide for parallel coolant flow paths, serial coolant flow paths, or a mixture of serial and parallel coolant flow paths, which may mitigate coolant flow resistance.

In some embodiments, a coolant thermal expansion compensator may be employed. For example, to facilitate fluctuations of liquid coolant volume over a certain temperature range, the coolant thermal expansion compensator may control or, more generally, accommodate such fluctuations.

In some embodiments, to provide for coolant flow through all the coolant reservoir assemblies 40, pumps with sufficient power may be employed to push the coolant through each of the coolant reservoir assemblies 40 to account for the pressure drop of across the entire system. In various embodiments, integral pumps that may be located above the batteries may be employed to help control flow rate, as well as flow meters to monitor the coolant flow. In some embodiments, temperature sensing sensors may be integrated into the system.

Figures 5D, 5E:
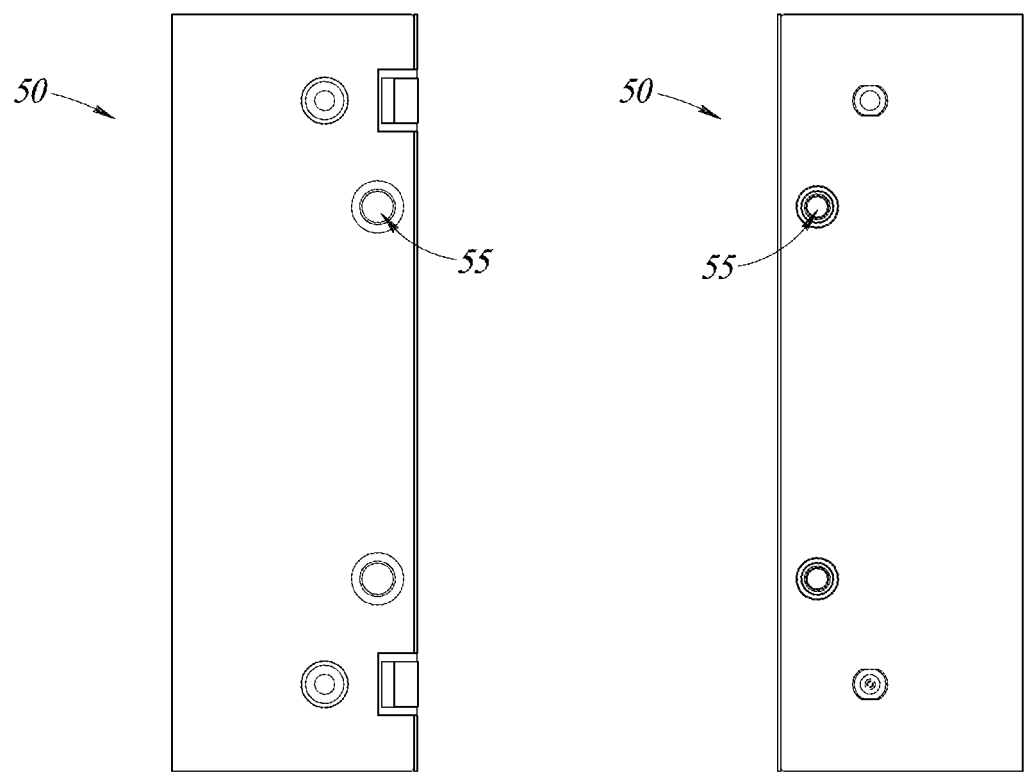
FIG. 5D illustrates a right side view of the battery containment structure of FIG. 5A.
FIG. 5E illustrates a left side view of the battery containment structure of FIG. 5A.

As illustrated in FIGS. 5E and 5D, the battery containment structure 50 may include a number of conduit ports 55, which are sized and shaped to receive conduits 57 as shown in FIG. 5B. The conduits 57 may fluidly couple the battery containment structure 50 to other battery containment structures 50, pumps, compressors, fittings, or the like.

Figure 6:
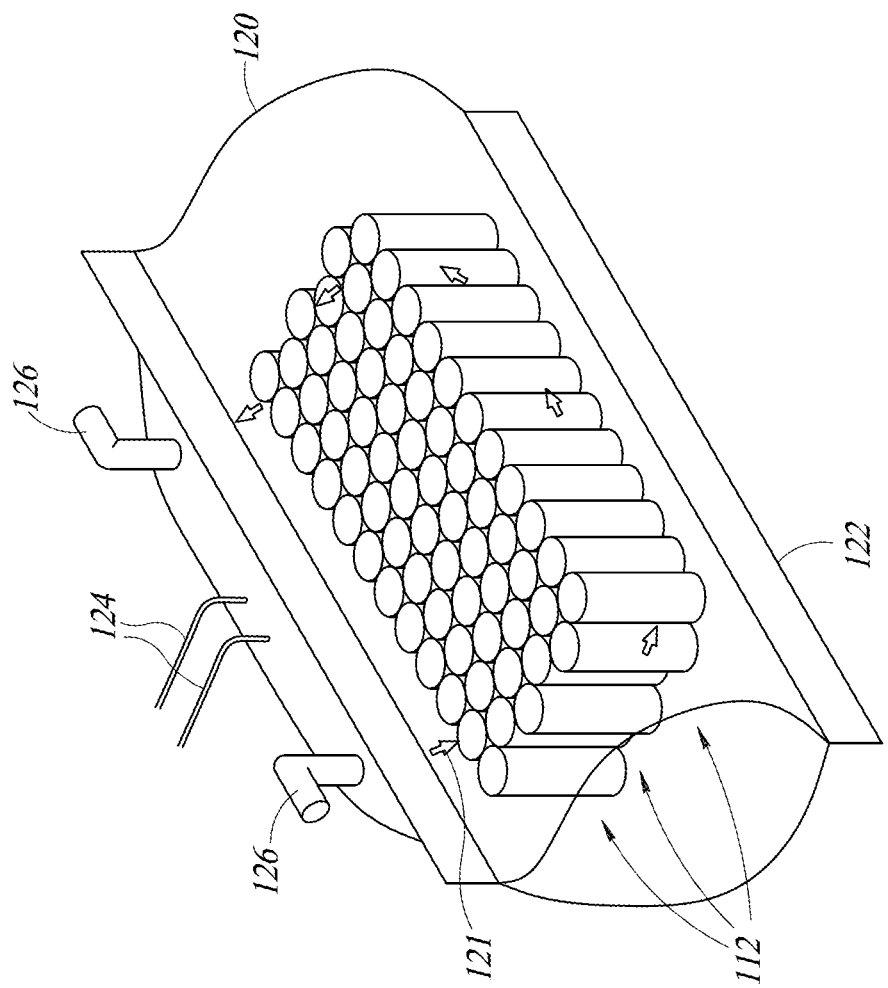
FIG. 6 illustrates an example battery and coolant reservoir package that includes a pouch and battery cells disposed within the pouch according to an example embodiment of the present disclosure.

FIG. 6 illustrates an example battery and coolant reservoir package 122 that includes a pouch 120 and a plurality of battery cells 112 disposed within the pouch 120 according to some example embodiments. The battery cells 112 disposed within the pouch 120 may be part of a battery module (see, for example, battery module 10). Disposed on the top of the pouch 120 are two coolant tube fittings 126 and two battery wires 124 that may be sealed wires, which in some embodiments may be sealed with epoxy or gasketing material to prevent coolant leakage. FIG. 6 further shows the direction of coolant fluid, indicated by arrows 121, flowing through the interior space of the pouch 120 in some embodiments. The battery and coolant reservoir package 122 generally correspond to the previously illustrated and described battery and coolant reservoir package 22 (see FIG. 3).

Figure 7A:
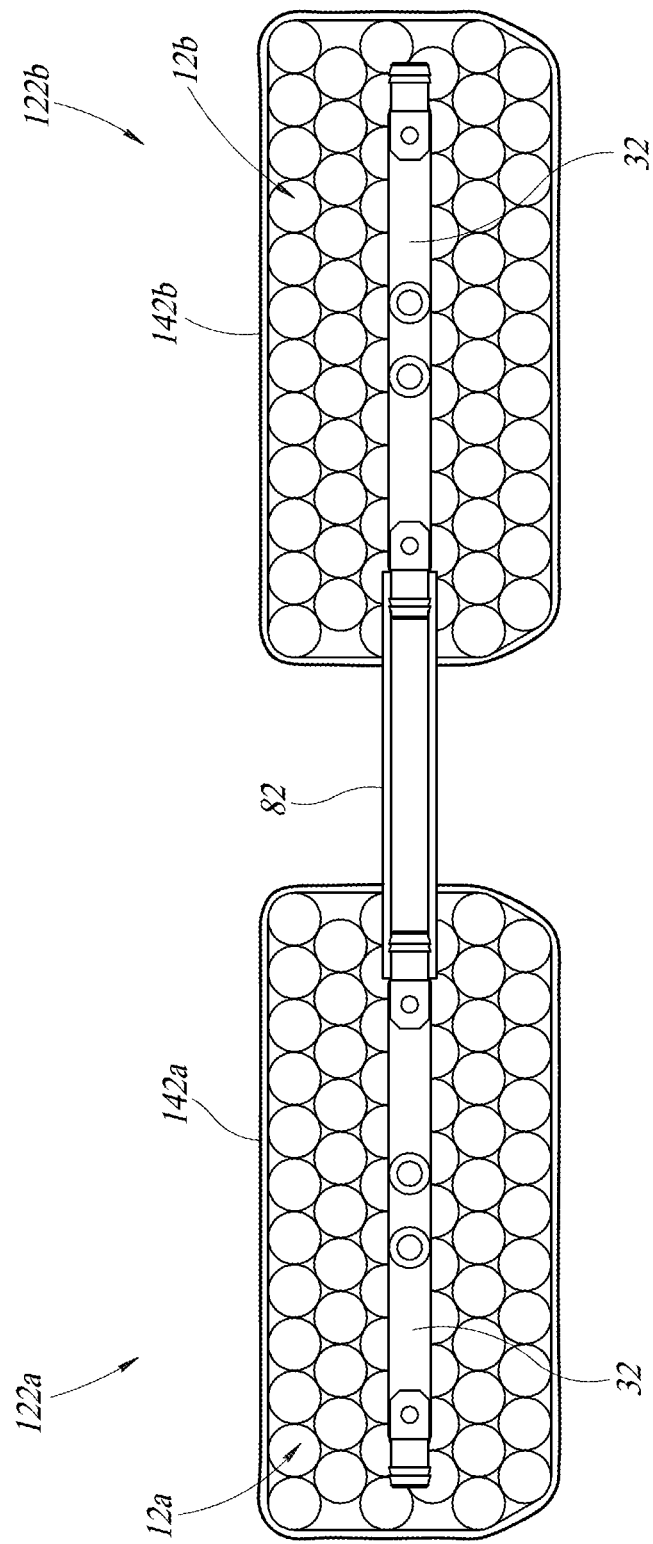
FIG. 7A illustrates a top down plan view of two adjacent battery and coolant reservoir packages according to an example embodiment of the present disclosure.

In various embodiments, a number of battery and coolant reservoir packages, such as the battery and coolant reservoir packages 22, 122 described above, may be interconnected to allow coolant to flow between the battery and coolant reservoir packages 22, 122 as will be further described and illustrated herein. FIG. 7A illustrates a top down or plan view of two adjacent battery and coolant reservoir packages 122a and 122b (which may correspond to the above-described battery and coolant reservoir package 22) in accordance with some example embodiments. As illustrated, battery and coolant reservoir package 122a includes case 142a, while battery and coolant reservoir package 122b includes case 142b. Note that in various embodiments, each case 142a and 142b may correspond to the case 42 illustrated in FIGS. 4A and 4B. Disposed within each of the cases 142a, and 142b are a first and a second plurality of battery cells 12a and 12b, respectively. The first plurality of battery cells 12a may be included in a first pouch (e.g., a pouch similar to pouch 20 of FIG. 3) and the second plurality of battery cells 12b may be included in a second pouch (e.g., a pouch similar to pouch 20 of FIG. 3). Note that for purposes of clarity, the first and second pouches are not illustrated in FIG. 7A. Connecting the first and second pouches is a coolant connecting line 82, which at one end is coupled to coolant tube fitting 126a and to coolant tube fitting 126b at another end. The coolant connecting line 82 is configured to permit coolant to flow from the interior of the first pouch (which includes battery cells 12a) to the interior of the second pouch (which includes battery cells 12b).

Figure 7B:
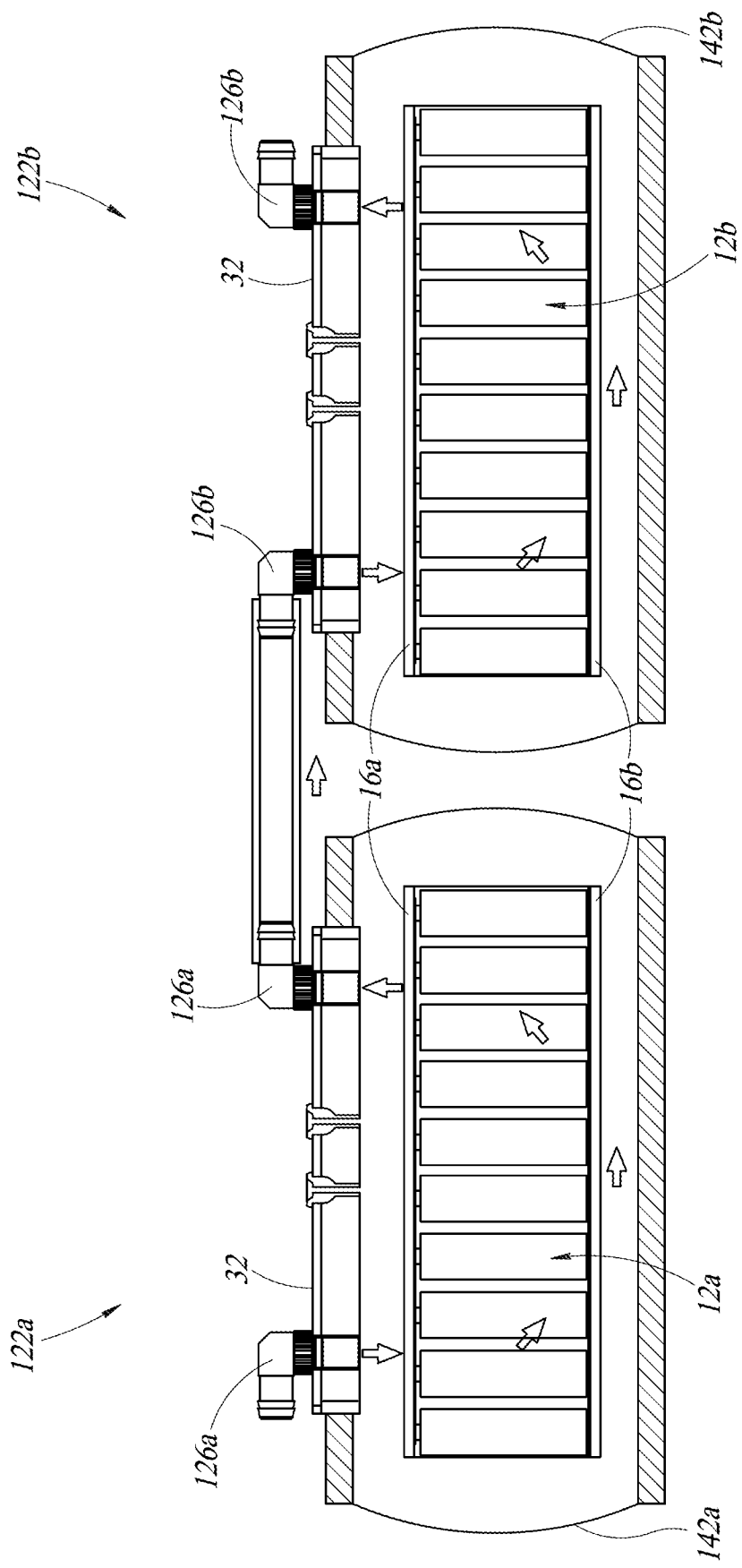
FIG. 7B is a cross-sectional side elevation view of the two adjacent battery and coolant reservoir packages illustrated in FIG. 7A.

FIG. 7B is a split side view of the two battery and coolant reservoir packages 122a and 122b illustrated in FIG. 7A. FIG. 7B shows the flow direction of a coolant flowing through the interior spaces of the first and second pouches of the first and second battery and coolant reservoir packages 122a and 122b, respectively. Note that although only two battery and coolant reservoir packages 122a and 122b are shown to be fluidly interconnected in FIGS. 7A and 7B, as one of ordinary skill in the art will recognize upon review of the present disclosure, more than two battery and coolant reservoir packages 122a and 122b may be interconnected in various alternative embodiments.

Figure 8C:
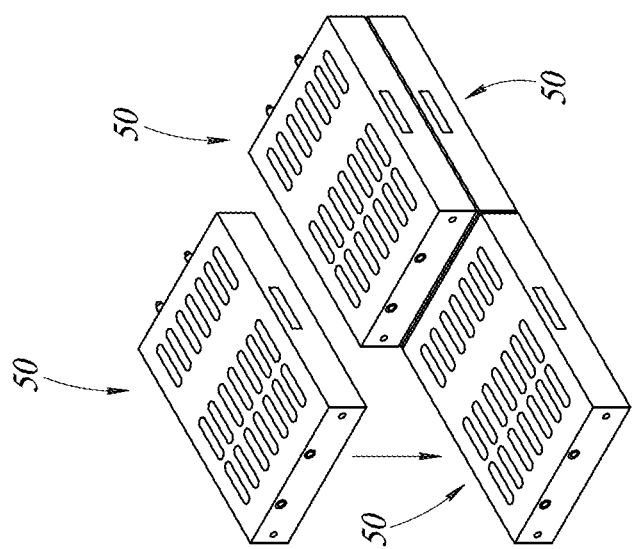
FIGS. 8A-8C are perspective views of arrangements of a battery containment structure according to an example embodiment of the present disclosure.
Figure 8B:
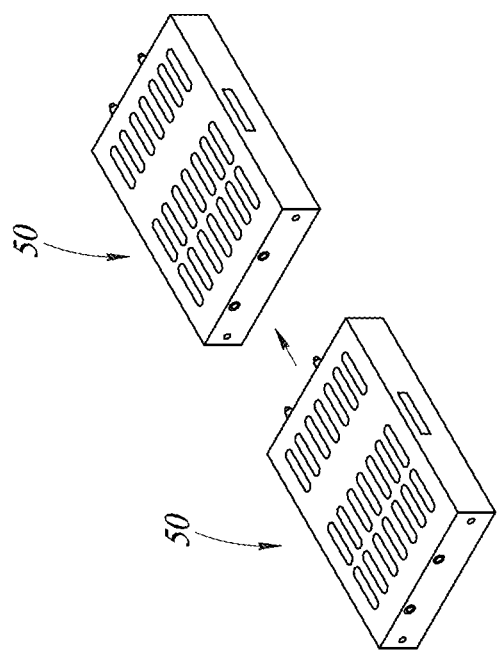
Figure 8A:
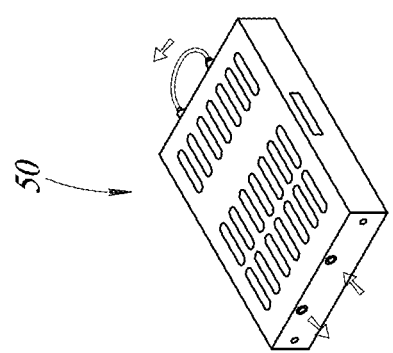

FIGS. 8A-8C illustrate scalability of the battery containment structure 50 described herein. As illustrated in FIGS. 8A-8C, in some embodiments, two and four battery containment structures 50 may be stacked together. By stacking and linking together these battery containment structures 50, the same coolant may flow through each of the linked battery containment structures 50.

FIG. 9A illustrates a side cross-sectional view of an example battery coolant reservoir assembly 240 according to some example embodiments. FIG. 9B is a cross-sectional view of the battery coolant reservoir assembly 240 of FIG. 9A, taken along line 9B-9B. As illustrated in FIGS. 9A and 9B, the battery coolant reservoir assembly 240 is generally similar to other embodiments described herein. For example, the battery coolant reservoir assembly 240 includes a case 242 and a battery and coolant reservoir package 222 (including one or more battery modules 10 disposed within the pouch 20—not shown). The case 242 includes cushion material 246 that may be disposed on the interior surface of an exterior structure 244. The battery coolant reservoir assembly 240 includes battery wires 124 (e.g., sealed wires) that are coupled to terminal posts 125, which penetrate through coolant inlet/outlet manifold 232 and that may be sealed to prevent coolant leakage. The portions of the terminal posts 125 that penetrate through the manifold 232 may be coupled to conductive lines 242a and 242b disposed within interior of the pouch disposed in the battery coolant reservoir assembly 240.

Figure 10:
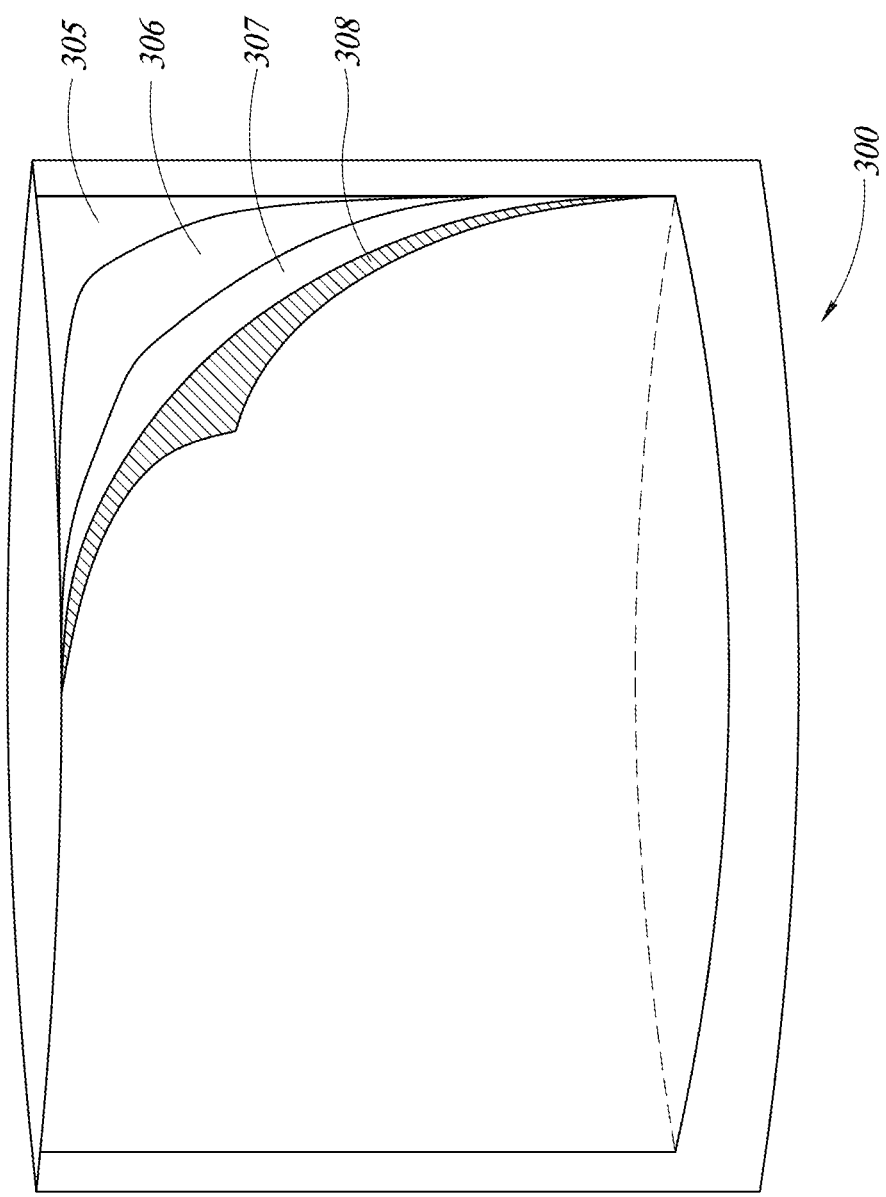
FIG. 10 illustrates a multi-layer liner of a pouch according to one or more embodiments of the present disclosure.

FIG. 10 illustrates an example multi-layer liner 300 that may be used to form the previously described pouch 20. As shown, the example multi-layer liner 300 includes four separate layers, including a first layer 305, a second layer 306, a third layer 307, and a fourth layer 308. In some embodiments, the first layer 305 includes an interior polythene (PE) layer that will come in contact with a coolant when the pouch 20 is filled with coolant, the second layer 306 includes a nylon layer, the third layer 307 includes an aluminum layer, and fourth layer 308 includes an external or outside polyethylene terephthalate (PET) layer. As indicated in FIG. 10, each of the layers 305-308 of the multi-layer liner 300 may be selected to have certain properties. For example, the first layer 305, e.g., interior polyethylene layer, may have desirable heat-sealing properties, not reactive to chemicals, and provide flexibility and strength. The second layer 306, e.g., nylon layer, may be abrasion resistant and may have elasticity without tearing. The third layer 307, e.g., aluminum layer, may protect against evaporation, relative light, and be reflective and ductile. The fourth layer 308, e.g., outside PET layer, may provide strength and may have low heat deformation properties. Note that in alternative embodiments, other types of materials may be employed that can provide similar properties.

Figure 11:
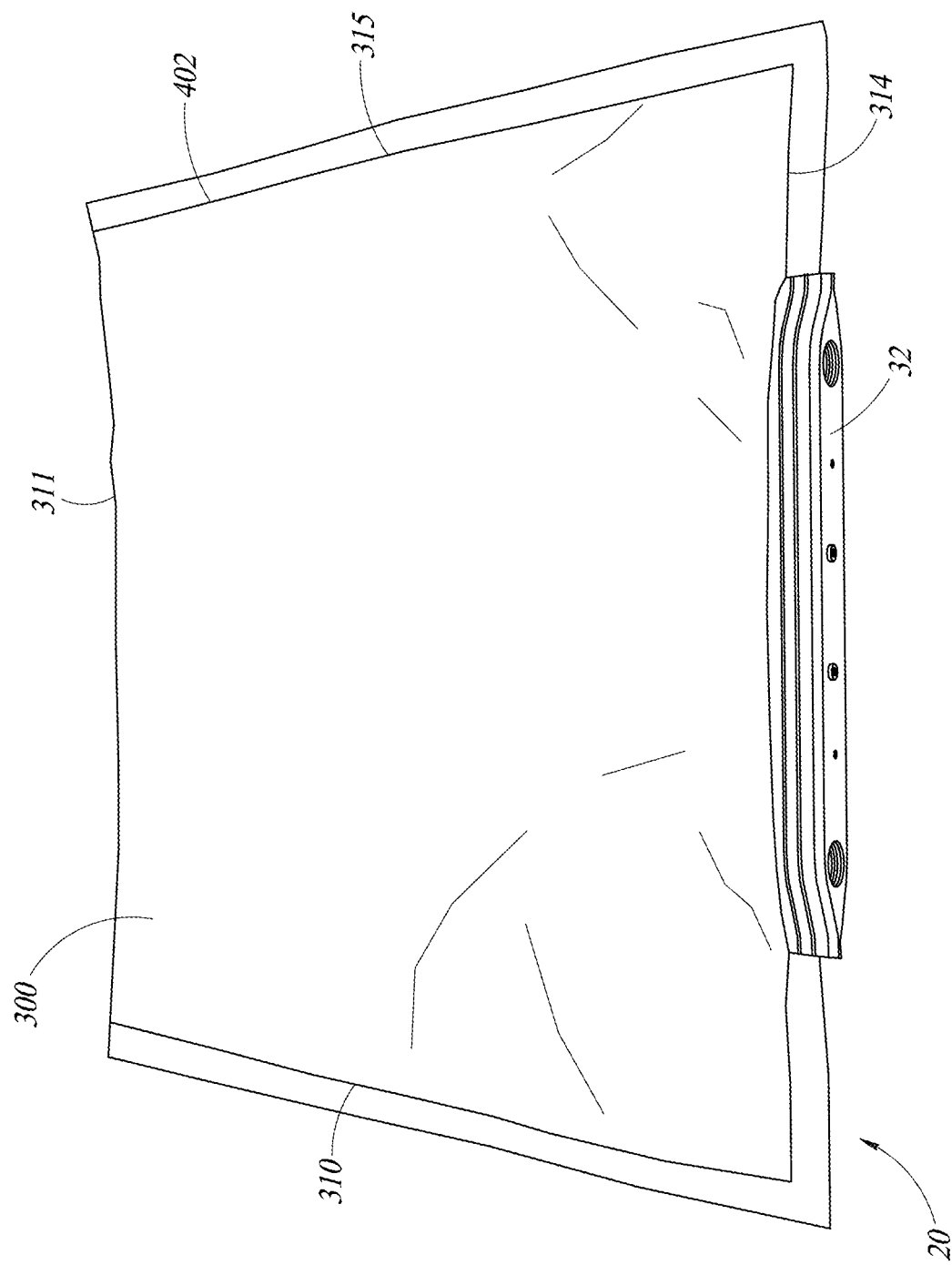
FIG. 11 illustrates multi-layer liners of FIG. 10 lying flat in preparation for forming a pouch according to one or more embodiments of the present disclosure.

FIGS. 11-14 illustrate how a battery and coolant reservoir package 22 may be assembled according to some embodiments. Referring particularly now to FIG. 11, which illustrates two multi-layer liners 300 lying flat on top of each other for forming a pouch 20. Note that because they are lying flat on top of each other, only one of the multi-layer liners 300 is visible in FIG. 11. The two multi-layer liners 300 have a proximal end 311 and a distal end 314. In various embodiments, the two multi-layer liners 300 may be sealed along the edges 402 of the proximal end 311, and two lateral sides 315, 316, but leave the distal end 314 unsealed. In some embodiments, the sealing of the edges of the three sides (e.g., proximal end 311 and the two lateral sides 315, 316) may involve heat sealing. Note that disposed at the proximal end 311 is the previously described coolant inlet/outlet manifold 32 that is disposed and sealed along edges of the proximal end 311 between the two multi-layer liners 300.

Figure 12A:
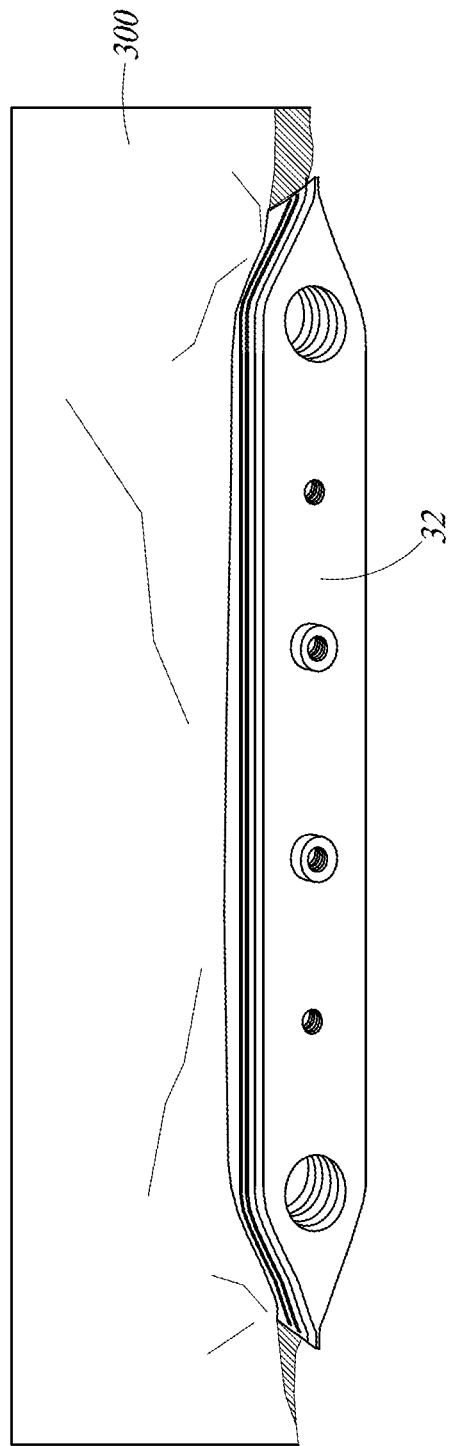
FIG. 12A illustrates a close-up view of a coolant inlet/outlet manifold according to an embodiment of the present disclosure disposed and sealed between two multi-layer liners of the pouch of FIG. 11.
Figure 12B:
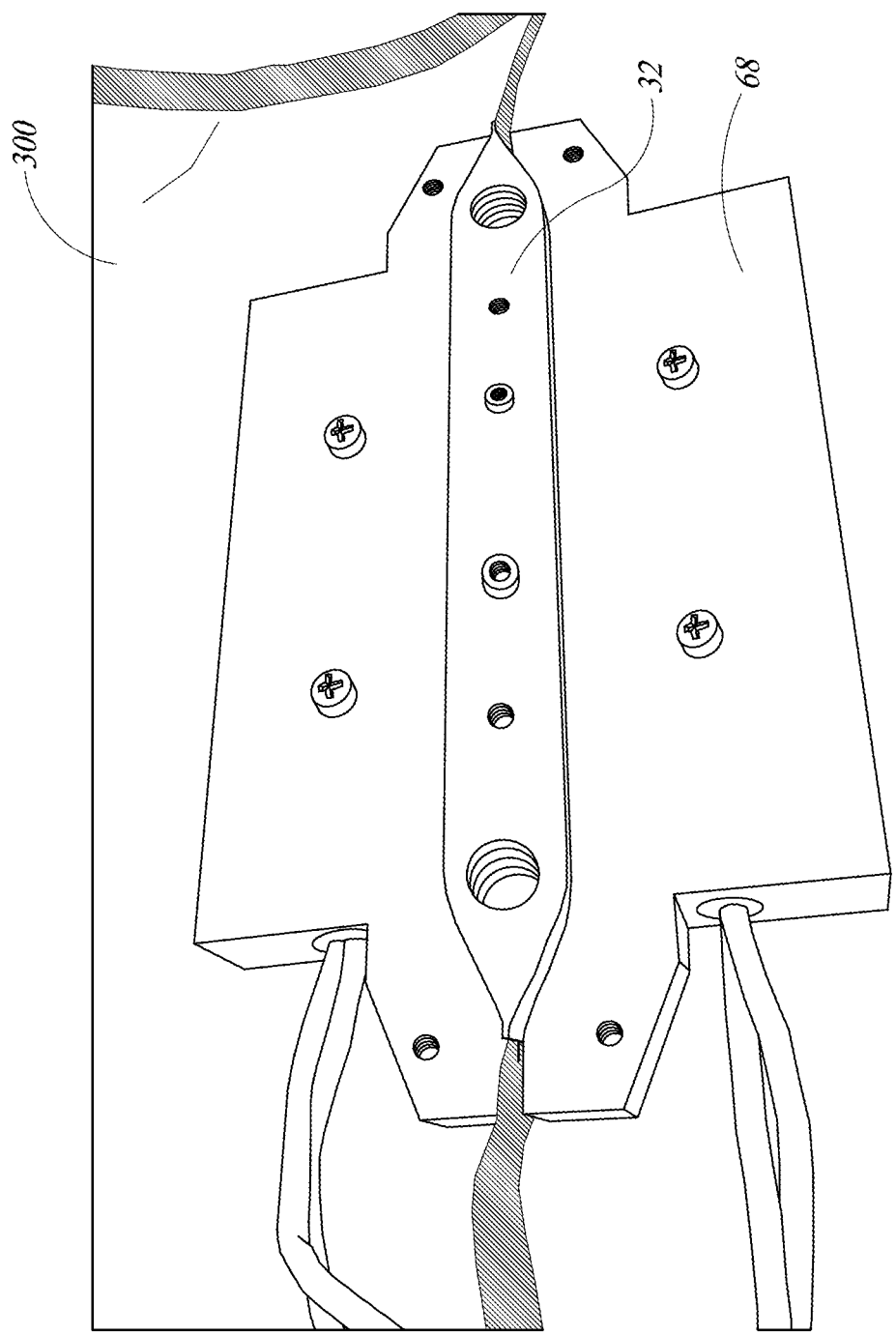
FIG. 12B illustrates the coolant inlet/outlet manifold of FIG. 12A, surrounded by a heating element for sealing the manifold to the pouch liner(s), according to an example embodiment of the present disclosure.

FIG. 12A is a close-up view of the coolant inlet/outlet manifold 32 disposed and sealed between two multi-layer liners 300 of the pouch illustrated in FIG. 11. FIG. 12B illustrates a coolant inlet/outlet manifold 32 surrounded by a heating element 68 that may be employed to seal the material (e.g., multi-layer liner 300) surrounding the coolant inlet/outlet manifold 32.

Figure 13:
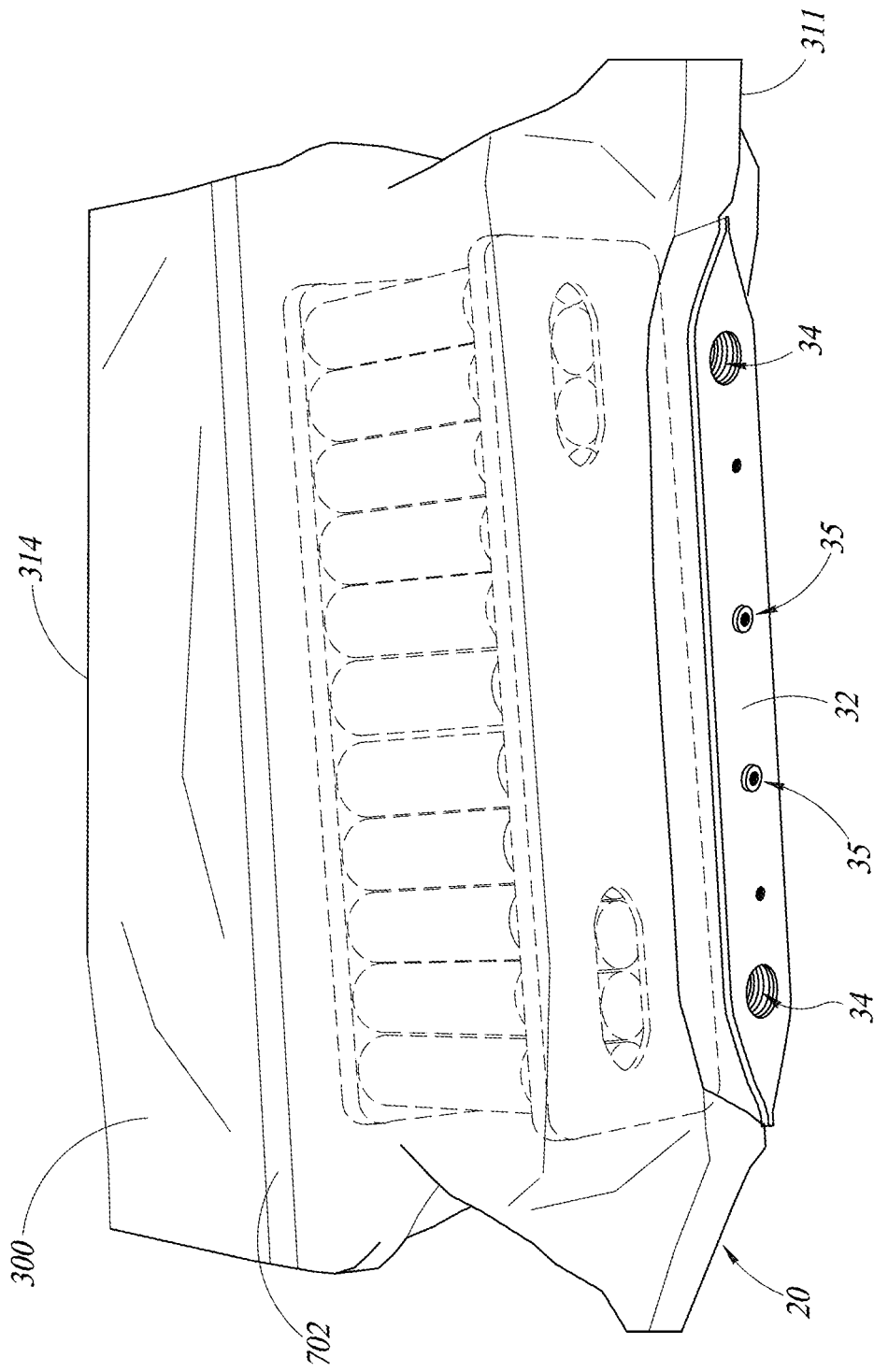
FIG. 13 illustrates the pouch of FIG. 11 with the coolant inlet/outlet manifold of FIG. 12A sealed thereto, ready for receiving and enclosing a battery module, according to an example embodiment of the present disclosure.

Once the three sides of the two multi-layer liners 300 (e.g., proximal end 311 and the two lateral sides 315, 316) are sealed as illustrated in FIGS. 12A and 12B, a partially sealed pouch 20 is formed. A battery module 10 may then be inserted into the pouch 20 through the open distal end 314 of the pouch 20 as illustrated in FIG. 13. Once the battery module 10 has been inserted into the pouch 20, the pouch 20 may then be sealed toward the distal end 314 of the pouch 20 along, for example, line 702 as illustrated in FIG. 13. In some embodiments, the pouch 20 may be selectively sealed toward the distal end 314 so that amount of interior void between the battery module 10 and the sealing line 702 is minimized. In other embodiments, however, the pouch 20 may be selectively sealed toward the distal end 314 so that the interior void created between the battery module 10 and the sealing line 702 is of sufficient size to meet certain selectable criteria (e.g., to ensure that there is sufficient volume of coolant in the pouch to properly regulate temperature).

Note that the proximal end 311 of the pouch 20 will be positioned on the top of the battery and coolant reservoir package 22 (see, e.g., FIGS. 3 and 4) that is to be formed. Note further that although not illustrated, in some embodiments, the battery module 10 that may be inserted into pouch 20 may already be wired (e.g., wired with conductive lines 242a and 242b of FIG. 9B) before insertion into the pouch 20. Thus, during insertion of the battery module 10 into the pouch 20, wires may be threaded through wiring ports (holes) 35 of the coolant inlet/outlet manifold 32, and the wiring ports 35 may be sealed at the manifold 32 to prevent coolant leakage, or the wires may be connected to terminal posts 125.

Figure 14:
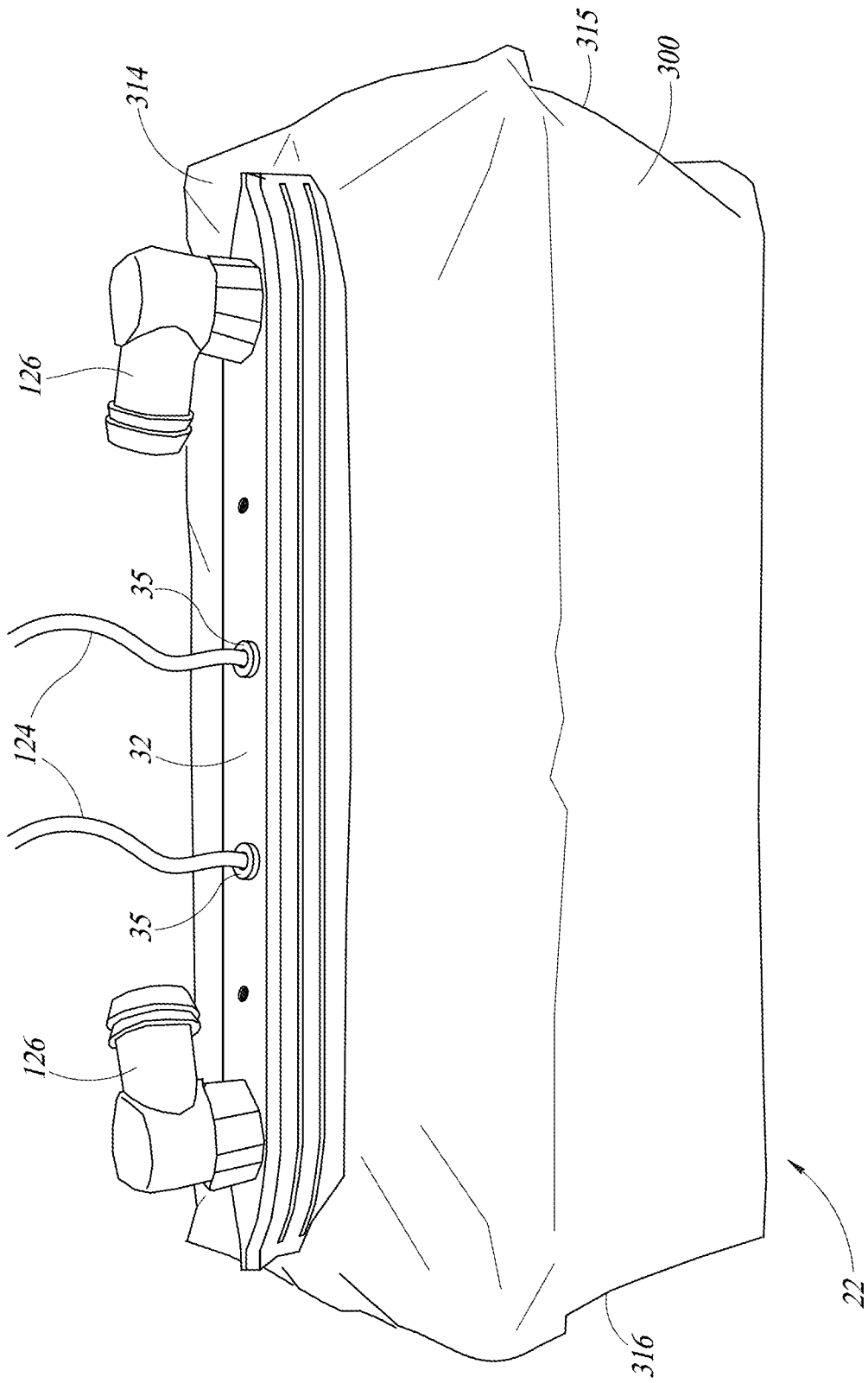
FIG. 14 illustrates an example battery and coolant reservoir package including a pouch that has been sealed and excess portions of multi-layer liner of the pouch are folded.

After the battery module 10 has been inserted into the pouch 20 and the distal end or side 314 of the pouch 20 has been sealed, excess portions of the multi-layer liner 300 of the pouch 20 may be folded to provide a more compact battery and coolant reservoir package 22 as illustrated in FIG. 14. For example, in FIG. 14 the excess portions of the multi-layer liner 300 of the pouch 20, on the lateral sides 315, 316 of the pouch 20, are folded as indicated in FIG. 14 as well as the excess portions of multi-layer liner 300 toward the distal end 314 of the pouch 20 shown in FIG. 13, which is underneath the battery and coolant reservoir package 22 in FIG. 14.

As can be seen in FIG. 14, two coolant tube fittings 126 have been inserted into two ports 34 (e.g., ports 34) of the coolant inlet/outlet manifold 32, and sealed battery wires 124 extend out of wiring ports 35 of the coolant inlet/outlet manifold 32. In various embodiments, coolant hoses may be attached to the coolant tube fittings 126 to supply to, as well as to discharge from, the battery and coolant reservoir package 22.

Figure 15:
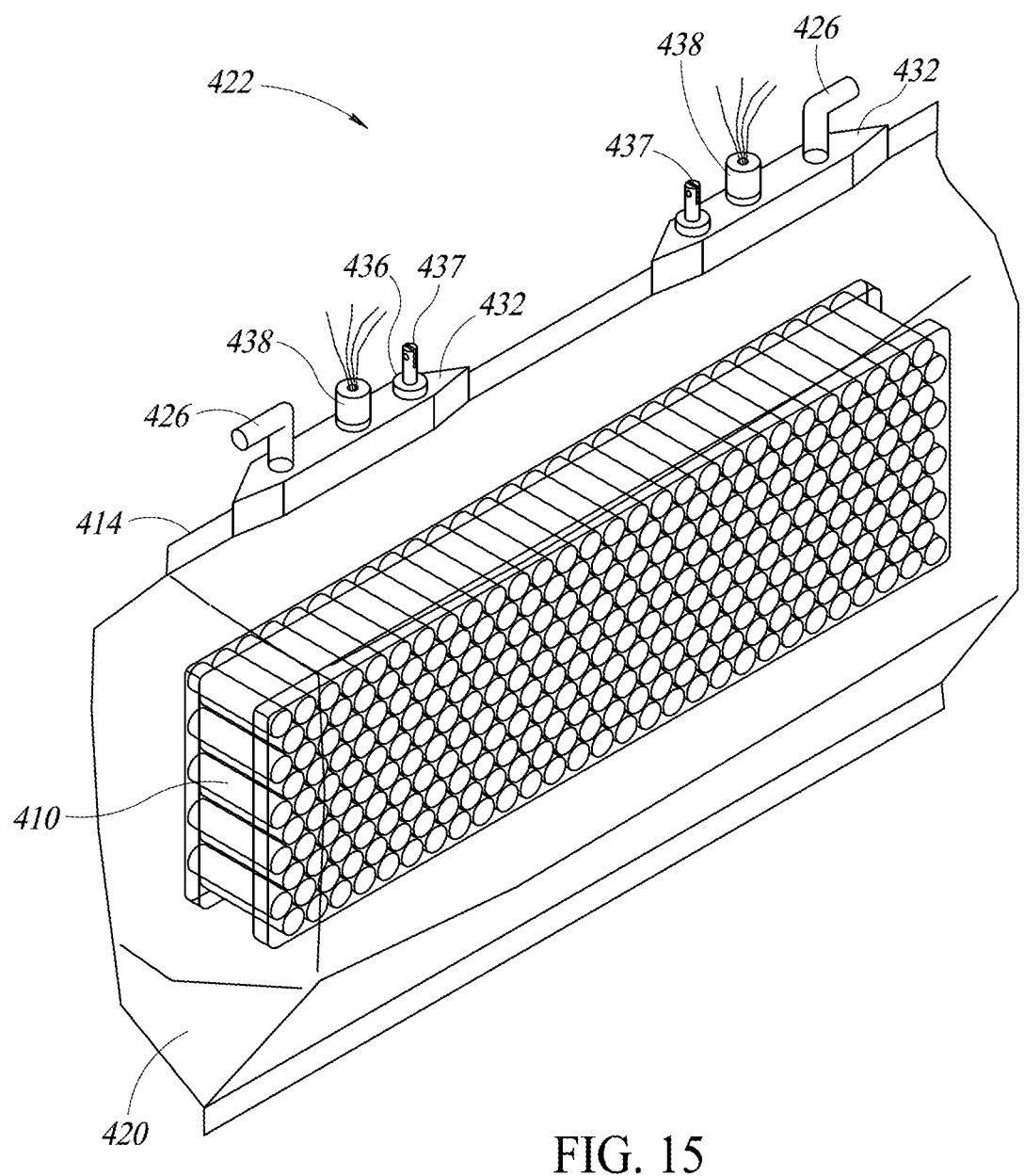
FIG. 15 illustrates a perspective view of a battery and coolant reservoir package according to an example embodiment of the present disclosure.

FIG. 15 illustrates a perspective view of battery and coolant reservoir package 422 according to another example embodiment. The battery and coolant reservoir package 422 is generally similar to the other embodiments described above. For example, the battery coolant reservoir package 422 includes a pouch 420 having that has been sealed and that encloses a battery module 410. For example, as illustrated in FIG. 15, a multilayer liner, e.g., multilayer liner 300, which forms the pouch 420, is sealed at its distal end 414. At the top of the pouch 420 are a pair of coolant inlet/outlet manifolds 432. Each of the coolant inlet/outlet manifolds 432 includes a coolant tube fitting 426 and a wiring connector 436. Protruding outwardly from the wiring connector 436, and coupled thereto is a battery terminal 437. As described above, the wiring connector 436 and the battery terminal 437 are electrically coupled to a top current collector, e.g., top current collector 16a, and a bottom current collector, e.g., bottom current collector 16b. Each of the coolant inlet/outlet manifolds 432 also includes optional wires protruding out of housing 438, which may be used for a wide variety of purposes, such as temperature sensors, battery condition, or status reporting (the housing 438 with optional wires is hereinafter referred to as sensor wires).

Figure 16A:
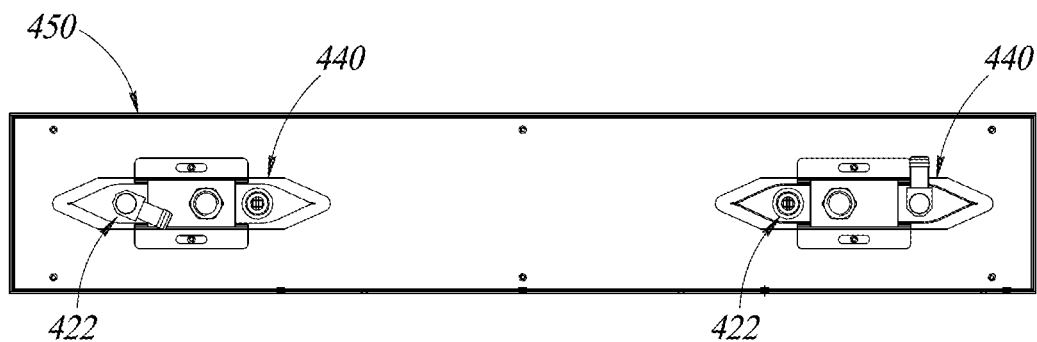
FIG. 16A illustrates a top plan view of a battery containment structure according to an example embodiment of the present disclosure.
Figure 16B:
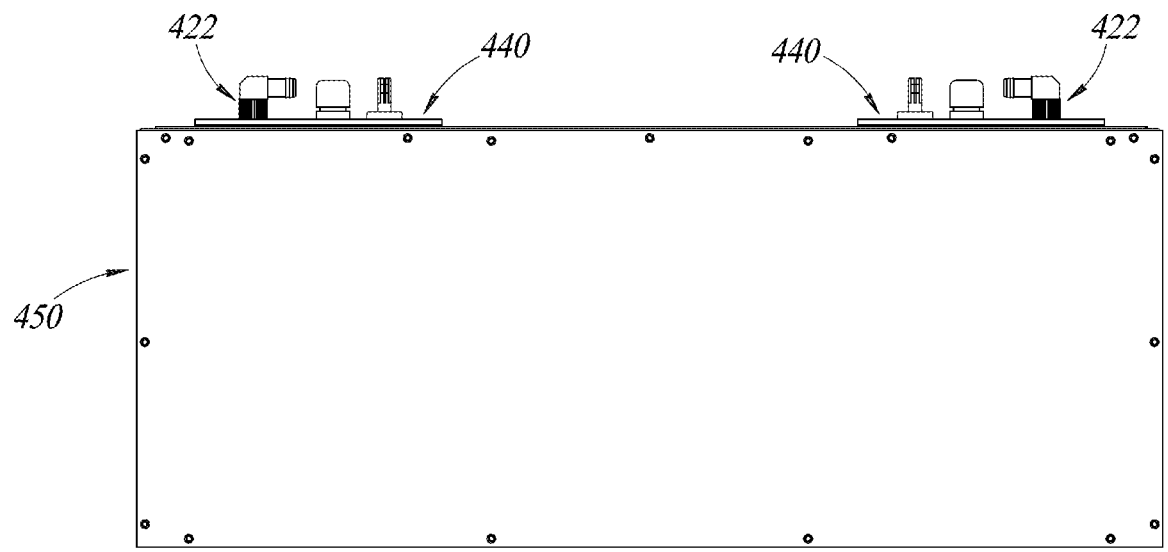
FIG. 16B illustrates a side view of the battery containment structure of FIG. 16A.

Further, the battery coolant reservoir package 422 may be received in various battery containment structures according to one or more embodiments. For example, FIGS. 16A and 16B illustrate a pair of adjacent battery coolant packages 422 that may be received in respective coolant reservoir assemblies 440. The coolant reservoir assemblies 440 are received in a battery containment structure 450.

Figure 17A:
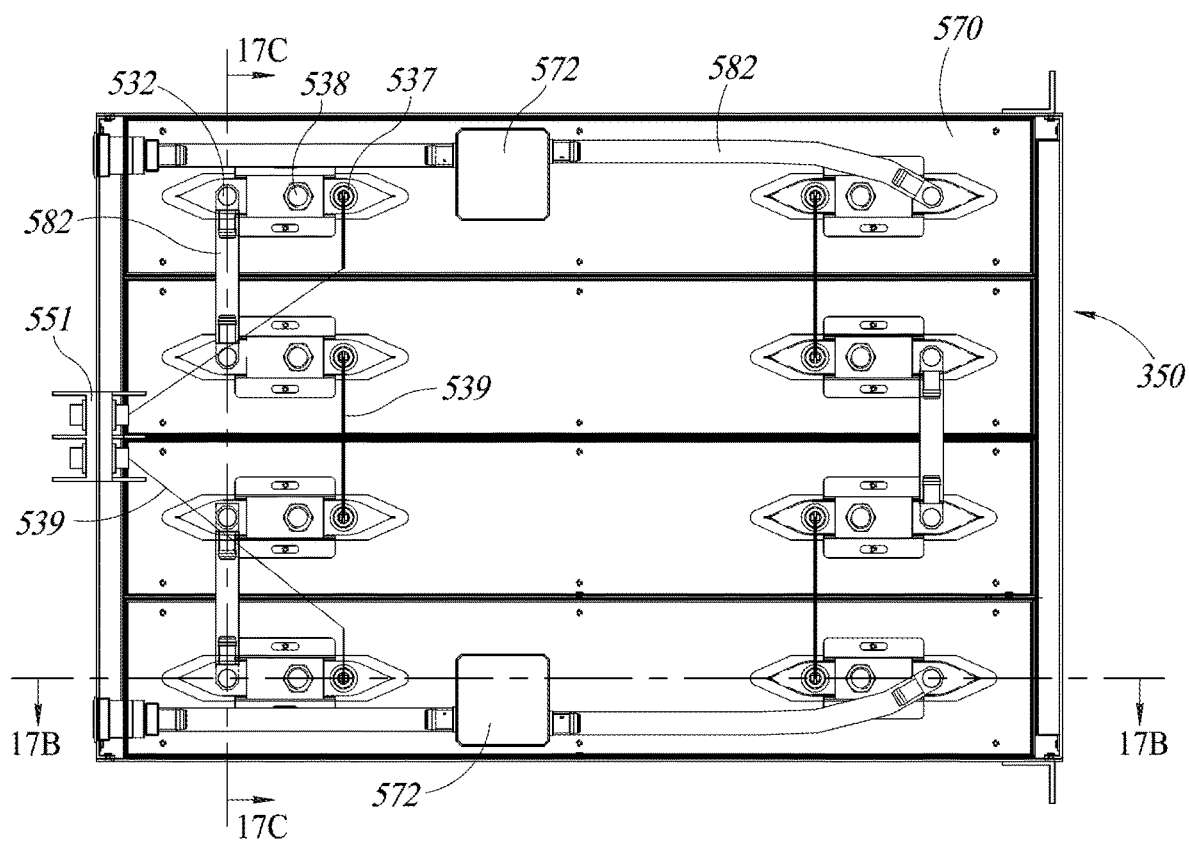
FIG. 17A illustrates a top plan view of a battery containment structure according to an example embodiment of the present disclosure.
Figure 17B:
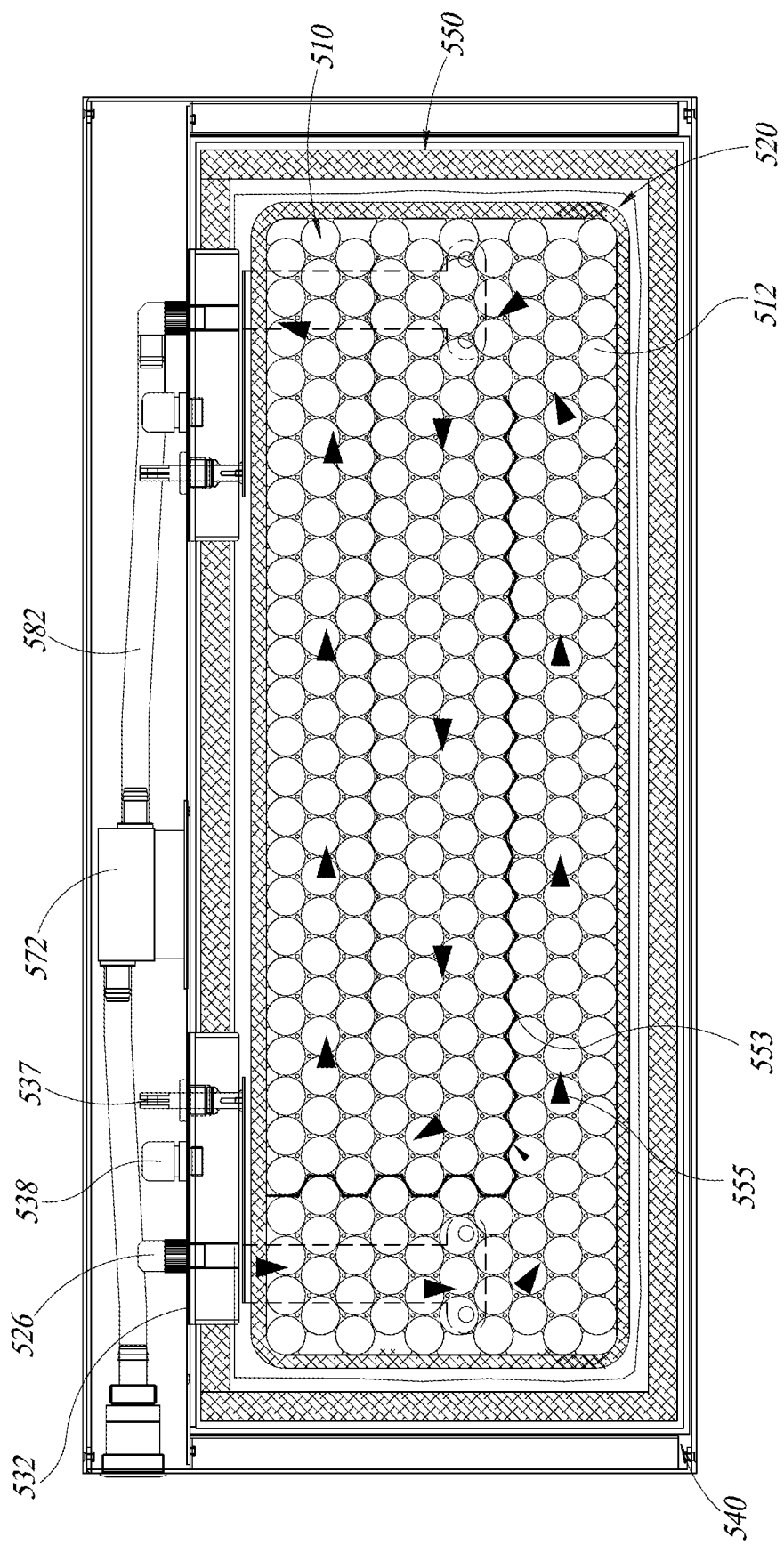
FIG. 17B is a front cross-sectional view of the battery containment structure of FIG. 17A, taken along line 17B-17B.
Figure 17C:
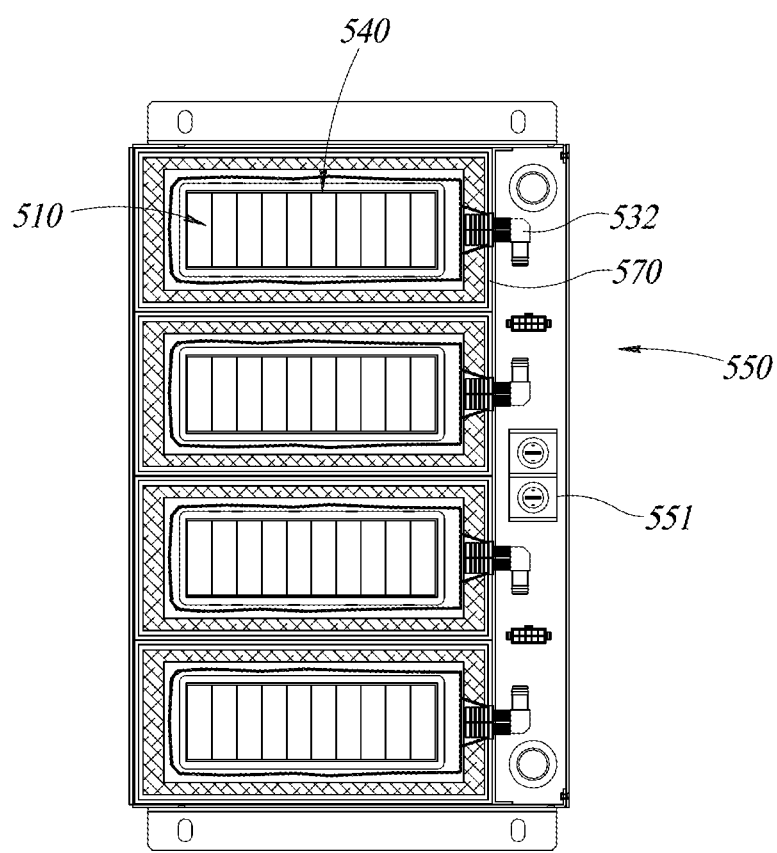
FIG. 17C is a side cross-sectional view of the battery containment structure of FIG. 17A.

FIGS. 17A, 17B, and 17C illustrate a battery containment structure 550 according to an example embodiment. The battery containment structure 550 is generally similar to the other battery containment structures described herein. The battery containment structure 550 includes an arrangement of coolant reservoir assemblies 540, which are similar to the coolant reservoir assemblies described herein, including coolant reservoir assembly 440. As described above, disposed on top of the coolant reservoir assemblies 540 are plates 570. In the embodiment illustrated in FIGS. 17A-17C there are four coolant reservoir assemblies 540 in the battery containment structure 550 underneath the plates 570. Similar to the embodiments of the coolant reservoir assemblies described herein, each of the coolant reservoir assemblies 540 includes pouches having a pair of coolant inlet/outlet manifolds 532. Each of the coolant inlet/outlet manifolds 532 includes a coolant tube fitting 526, sensor wires 538, and a battery terminal 537. In this embodiment, the coolant tube fittings 526, sensor wires 538, and the battery terminals 537 extend outwardly and away from the plates 570. The four coolant reservoir assemblies 540 are interconnected via coolant connecting lines 582 and coolant pumps 572, e.g., inline coolant pumps. As illustrated in FIGS. 17A and 17B, in this embodiment, the coolant flows through the battery modules 510 in series.

As illustrated in FIGS. 17A and 17B, the battery containment structure 550 includes a power block 551. The power block 551 is generally configured to manage the supply of power to the battery modules 510 within respective pouches 520. The battery terminals 537 of the coolant reservoir assemblies 540 are electrically coupled to the power block 551 and interconnected with each other via wires 539. As illustrated in FIG. 17B in detail, battery cells 512 of the battery module 510 are separated by partitioning 553, which partitioning 553 is sized and shaped to facilitate coolant flow, indicated by arrows 555.

Figure 18A:
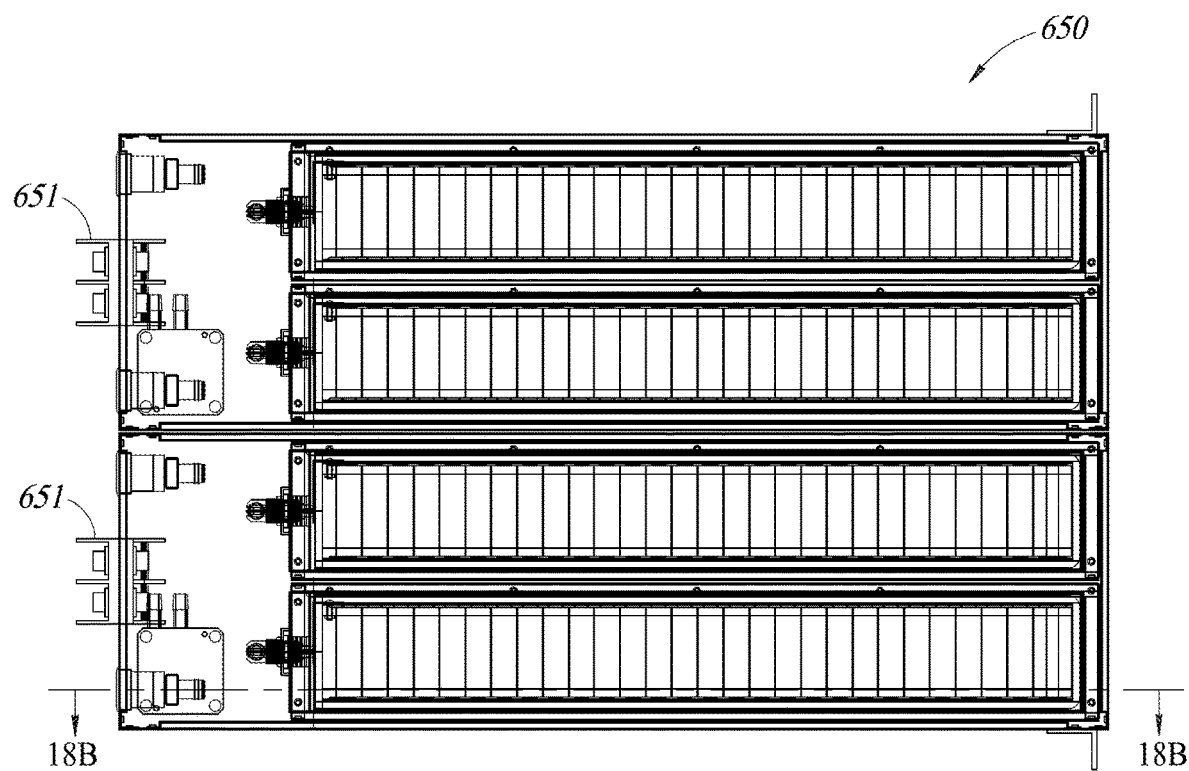
FIG. 18A illustrates a top plan view of a battery containment structure according to an example embodiment of the present disclosure.
Figure 18B:
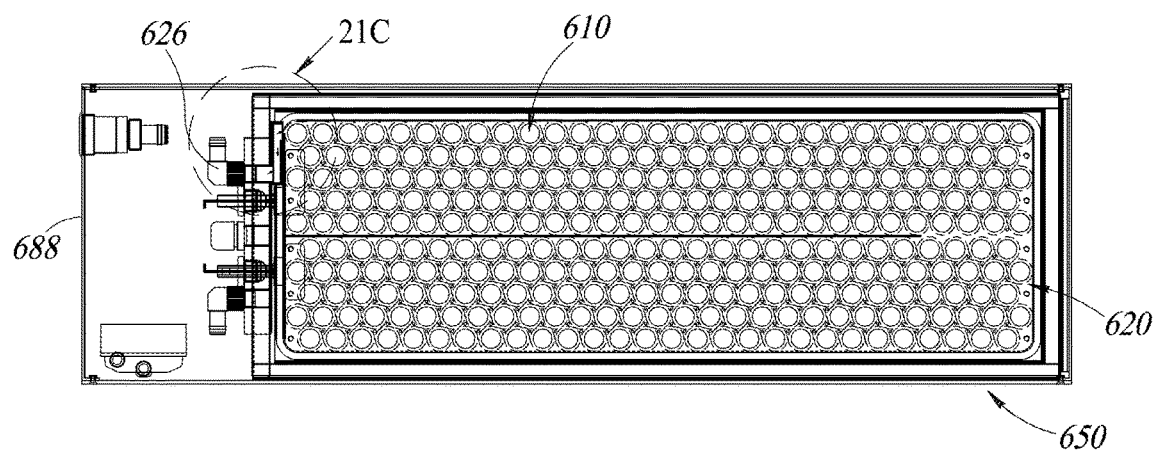
FIG. 18B is a front cross-sectional view of the battery containment structure of FIG. 18A, taken along line 18A-18A.
Figure 18C:
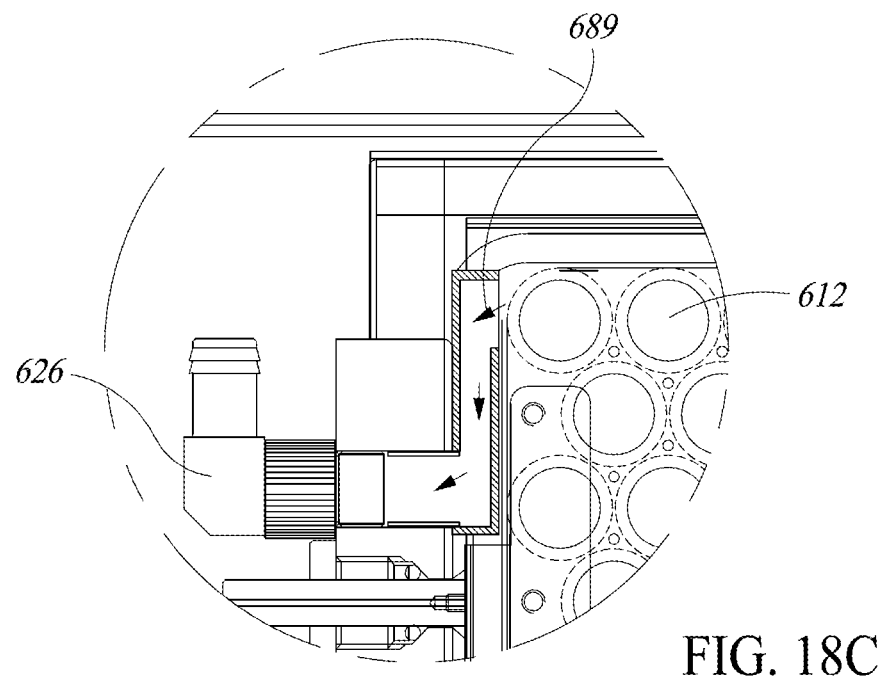
FIG. 18C is a detailed view of a portion of the battery containment structure of FIG. 18B.
Figure 18D:
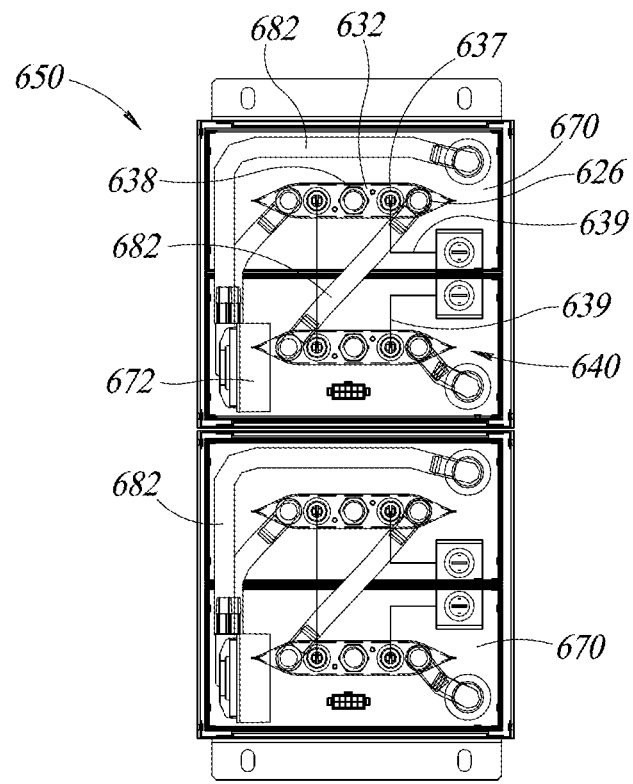
FIG. 18D is a side cross-sectional view of the battery containment structure of FIG. 18A.

FIGS. 18A-18D illustrate a battery containment structure 650 according to an example embodiment. The battery containment structure 650 is generally similar to the other battery containment structures described herein. The battery containment structure 650 includes an arrangement of coolant reservoir assemblies 640, which are similar to the coolant reservoir assemblies described herein, including coolant reservoir assembly 540. For example, the battery containment structure 650 includes coolant reservoir assemblies 640 positioned internal to plates 670. Similar to the embodiments of the coolant reservoir assemblies described herein, each of the coolant reservoir assemblies 640 include pouches having a coolant inlet/outlet manifold 632. Each of the coolant inlet/outlet manifolds 632 includes a coolant tube fitting 626, sensor wires 638, and a battery terminal 637. In this embodiment, the coolant tube fittings 626, sensor wires 638, and the battery terminals 537 extend outwardly and toward a rear 688 of the battery containment structure 650. The four coolant reservoir assemblies 640 are interconnected via coolant connecting lines 682 and coolant pumps 672. As illustrated in FIGS. 18A-18D, the battery containment structure 650 includes a pair of power blocks 651. The power block 651 is generally configured to manage the supply of power to the battery modules 610 having battery cells 612 within respective pouches 620. The battery terminals 637 of the coolant reservoir assemblies 640 are electrically coupled to the power blocks 651 and interconnected with each other via wires 639. As illustrated in FIG. 18C in detail, coolant flows to and from the coolant tube fitting 626, for example, as indicated by arrows 689.

Figure 19A:
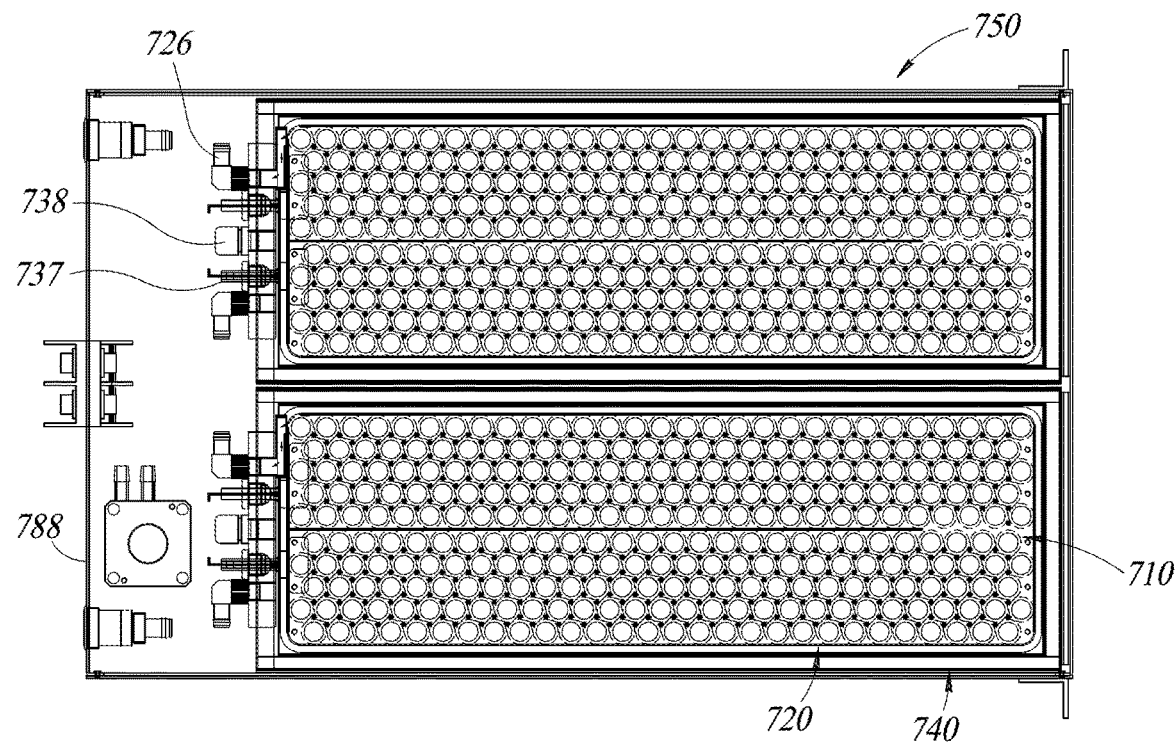
FIG. 19A illustrates a top plan view of a battery containment structure according to an example embodiment of the present disclosure.
Figure 19B:
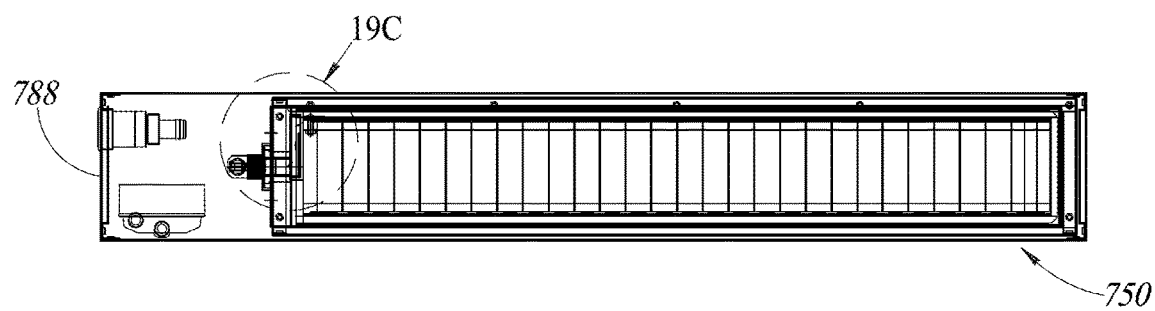
FIG. 19B is a front cross-sectional view of the battery containment structure of FIG. 19A.
Figure 19C:
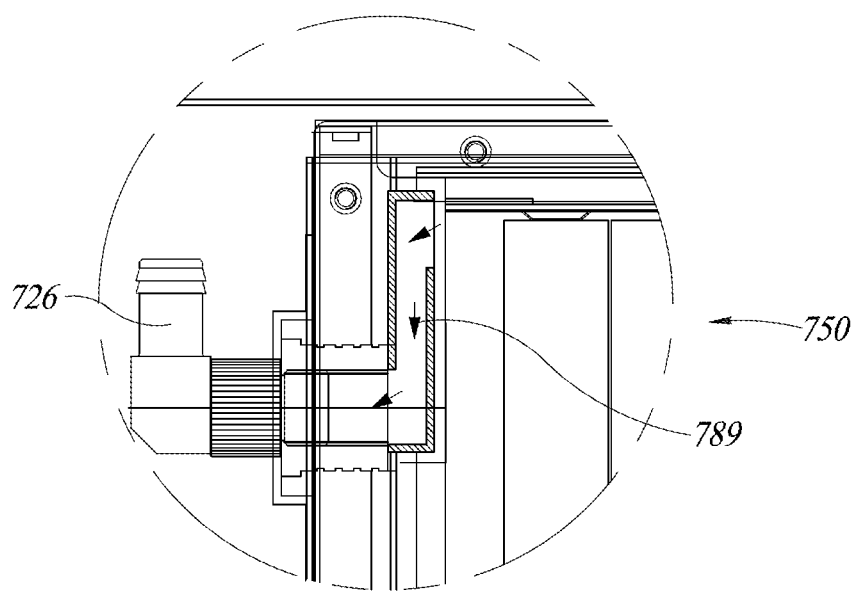
FIG. 19C is a detailed view of a portion of the battery containment structure of FIG. 19B.
Figure 19D:
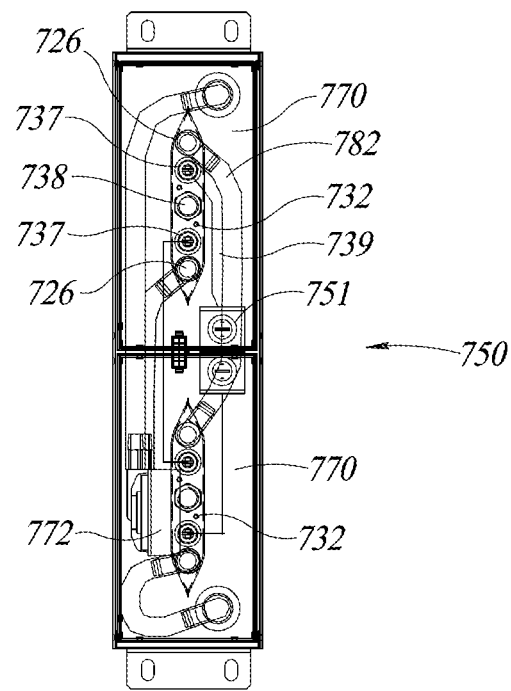
FIG. 19D is a side view of the battery containment structure of FIG. 19A.

FIGS. 19A-19D illustrate a battery containment structure 750 according to an example embodiment. The battery containment structure 750 is generally similar to the other battery containment structures described herein. The battery containment structure 750 includes an arrangement of coolant reservoir assemblies 740, which are similar to the coolant reservoir assemblies described herein, including coolant reservoir assembly 640. For example, the battery containment structure 750 includes a pair of coolant reservoir assemblies 740 positioned internal to plates 770. Similar to the embodiments of the coolant reservoir assemblies described herein, each of the coolant reservoir assemblies 740 includes pouches which have a coolant inlet/outlet manifold 732. Each of the coolant inlet/outlet manifolds 732 includes pairs of coolant tube fittings 726, battery terminals 737, and sensor wires 738. In this embodiment, the coolant tube fittings 726, sensor wires 738, and the battery terminals 737 extend outwardly and toward a rear 788 of the battery containment structure 750. The two coolant reservoir assemblies 740 are interconnected via coolant connecting lines 782 and a coolant pump 772. Note that the coolant connecting lines 782 and coolant pump 772 are not shown in FIGS. 19A and 19B for clarity of illustration and description. As illustrated in FIGS. 19A-19D, the battery containment structure 750 includes a power blocks 751. The power block 751 is generally configured to manage the supply of power to the battery modules 710 within respective pouches 720. The battery terminals 737 of the coolant reservoir assemblies 740 are electrically coupled to the power blocks 751 and interconnected with each other via wires 739. As illustrated in FIG. 19C in detail, coolant flows to and from the coolant tube fitting 726, for example, as indicated by arrows 789.

Figure 20A:
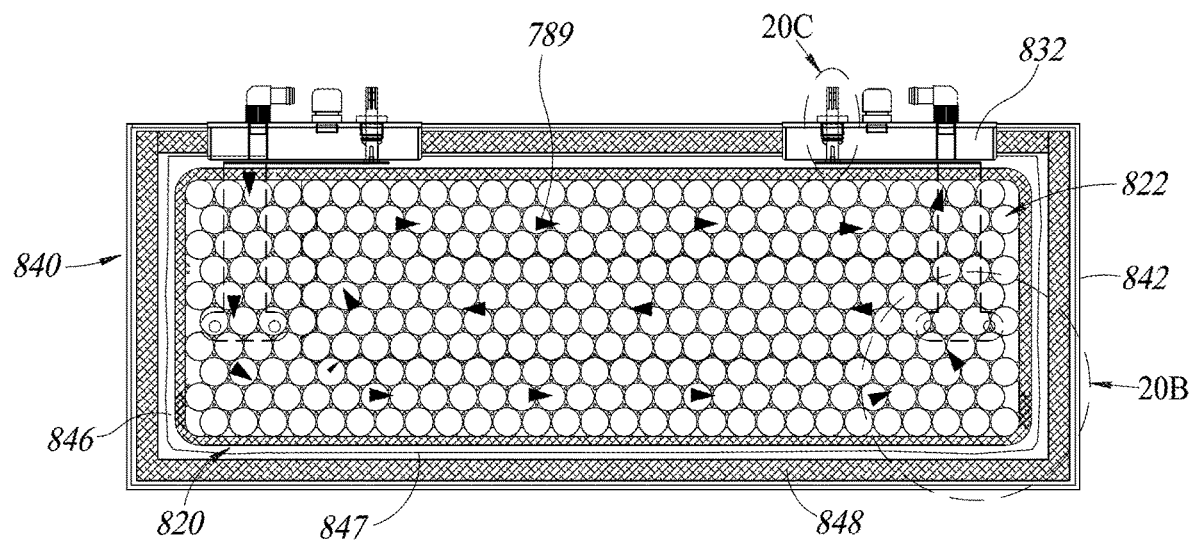
FIG. 20A is side cross-sectional view of a battery coolant reservoir assembly according to an example embodiment of the present disclosure.
Figure 20B:
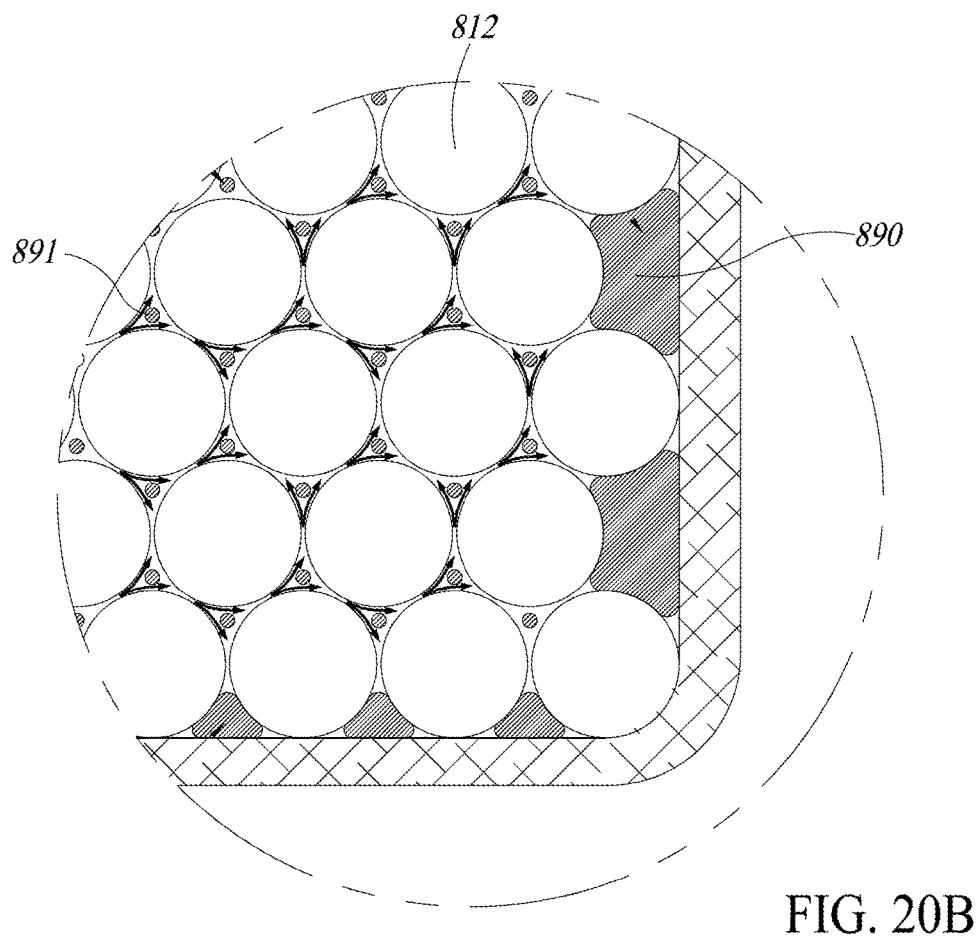
FIG. 20B is a detailed view of a portion of the battery coolant reservoir assembly of FIG. 20A.
Figure 20C:
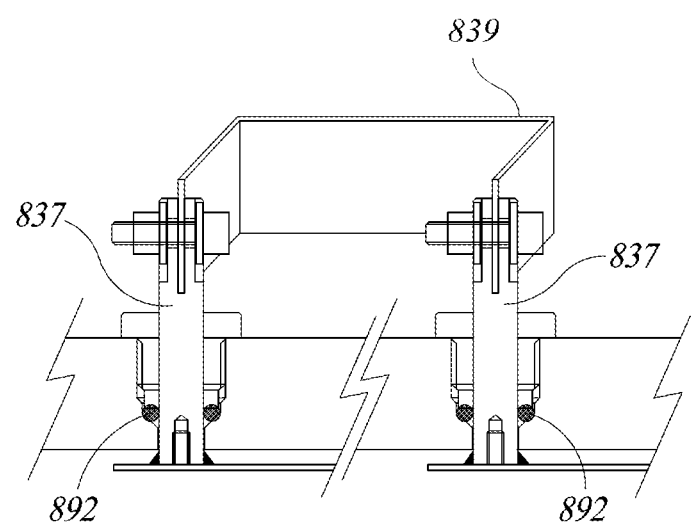
FIG. 20C is another detailed view of a portion of the battery coolant reservoir assembly of FIG. 20A.

FIGS. 20A-20C illustrate an example battery coolant reservoir assembly 840 in accordance with some example embodiments of the present disclosure. The battery coolant reservoir assembly 840 is generally similar to the embodiments of the battery reservoir assembly described herein, e.g., battery reservoir assembly 40, and includes a case 842 and a battery and coolant reservoir package 822 (including one or more battery modules 10 disposed within pouch 820—not shown). In this embodiment, the case 842 comprises a number of layers. For example, the case 842 comprises a first cushion layer or material 846, a vinyl layer or material 847, and a second cushion layer 848. Further, in this embodiment, interposed between battery cells 812 are edge fillers 890 and internal fillers 891. The edge fillers 890 and internal fillers 891 can comprise various resins. As shown in FIG. 20B, the edge fillers 890 and the internal fillers 891 only partially occupy voids or spacing between battery cells 812 to allow coolant liquid to flow therebetween. The edge fillers 890 and the internal fillers 891 are generally configured to reduce the total volume of coolant required to provide weight and cost benefits. As described above, coolant reservoir assemblies include coolant inlet/outlet manifolds that are sealed. In some embodiments, as illustrated in detail in FIG. 20C, a coolant inlet/outlet manifold 832 includes a battery terminal 837. The coolant inlet/outlet manifold 832 may also include a sealing device, e.g., an O-ring 892 to seal the coolant inlet-/outlet manifold 832. Further, as illustrated in FIG. 20C in detail, the coolant inlet/outlet manifold 832 may also include a bus bar 839. The bus bar 839 may, alternative to wires, couple the battery terminals 837. The bus bar 839 is generally configured to provide higher amperage to wires.

Figure 21A:
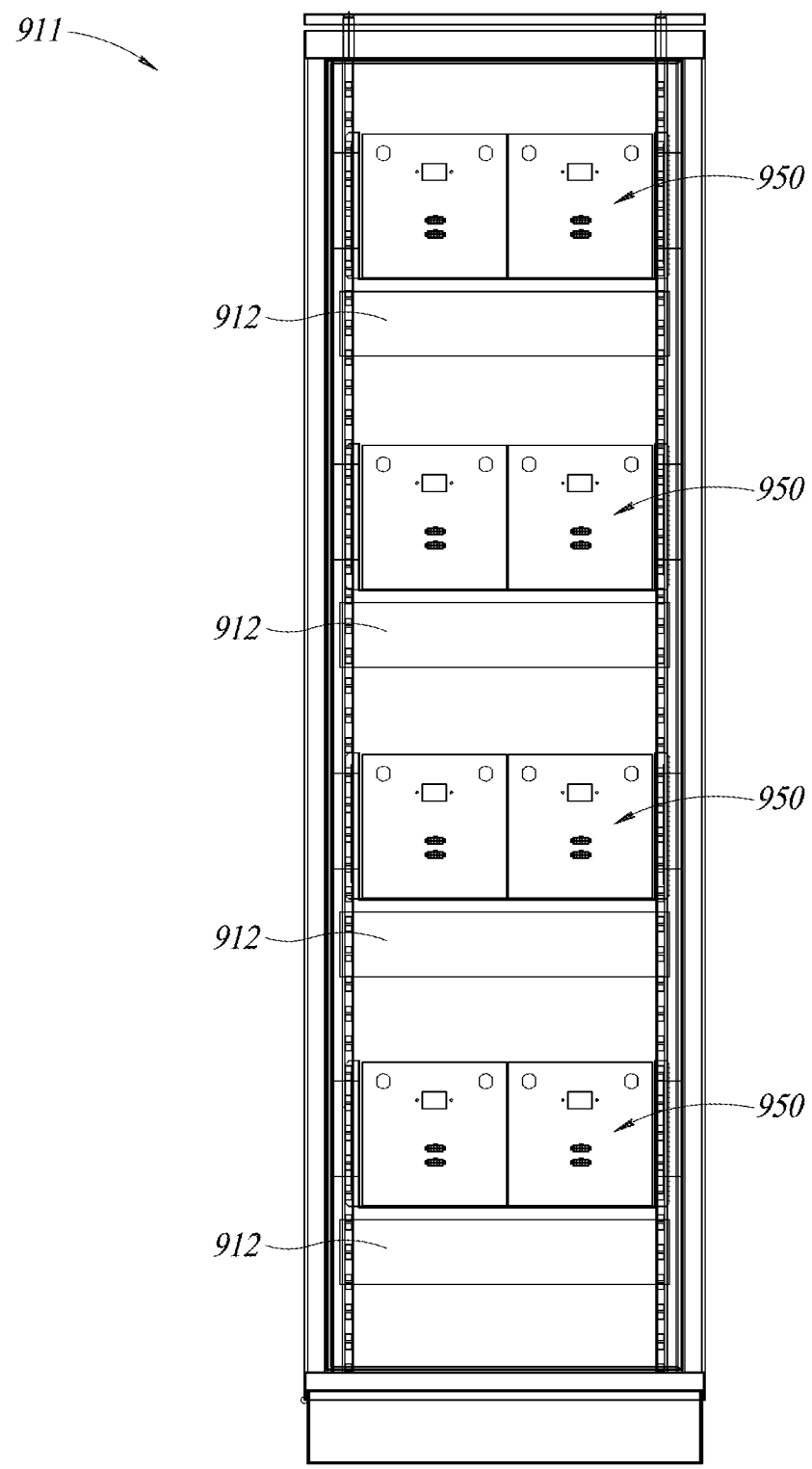
FIG. 21A is a top plan view of a plurality of battery containment structures positioned in a cabinet rack frame.
Figure 21B:
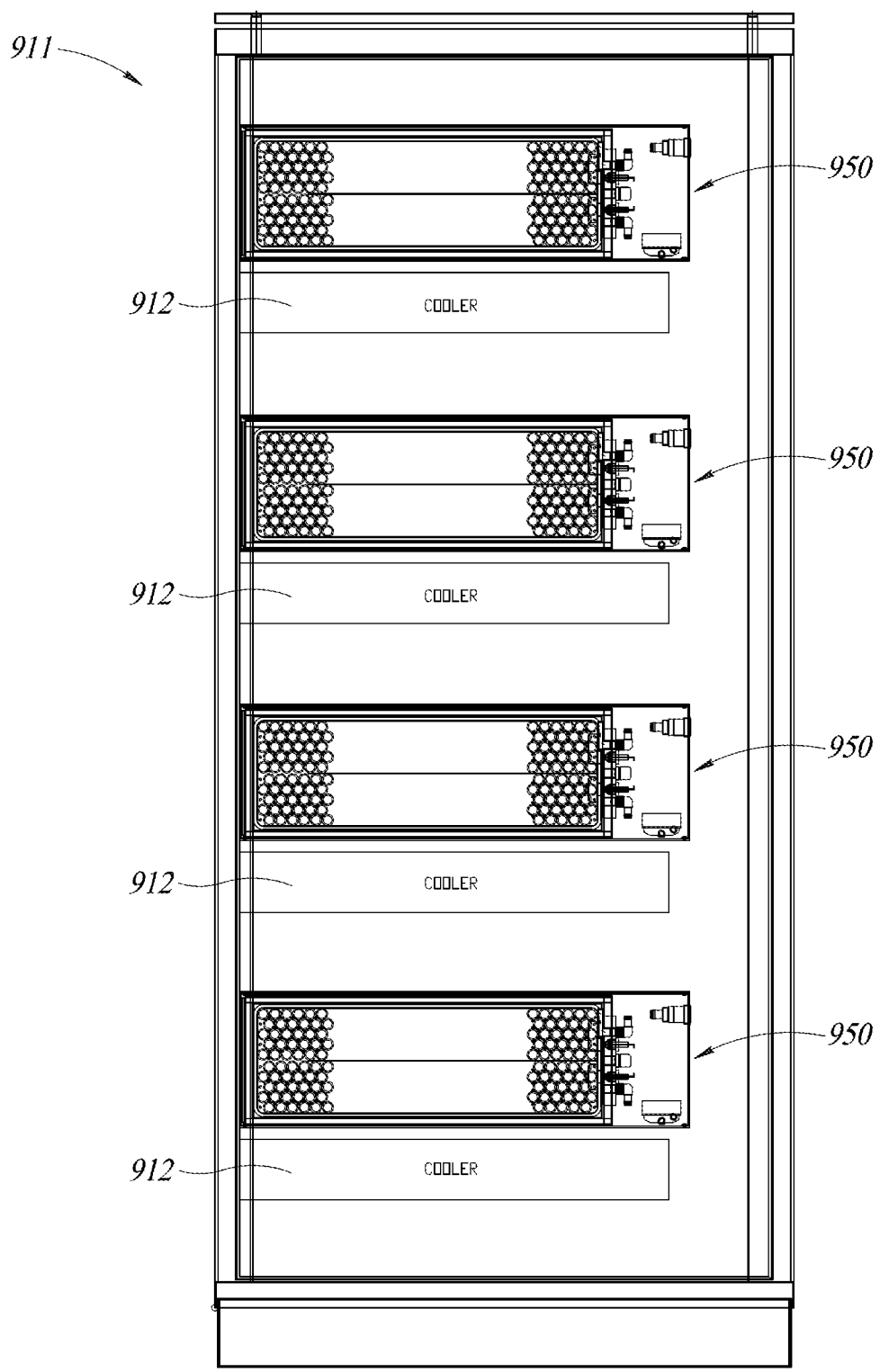
FIG. 21B is a side view of the cabinet rack frame of FIG. 21A.
Figure 21C:
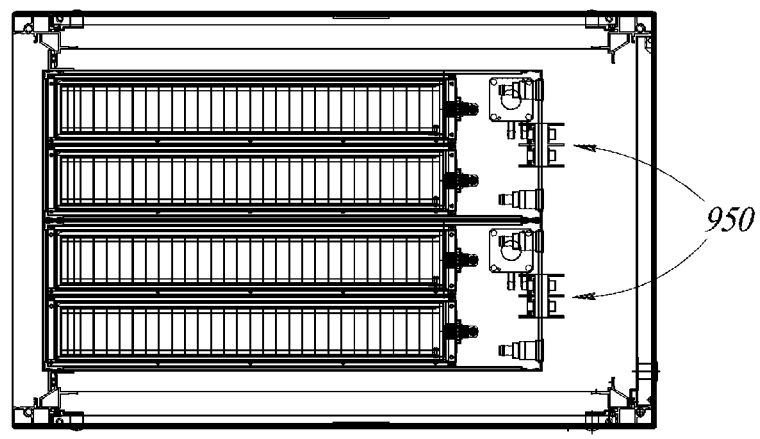
FIG. 21C is front view of the cabinet rack frame of FIG. 21B.

FIGS. 21A-21C illustrate a battery module rack 911. The battery module rack 911 is sized, shaped, and arranged to receive a plurality of battery containment structures 950. The battery containment structures 950 are generally similar to the embodiments described herein. The battery module rack 911 may further include a plurality of coolers 912. The coolers 912 are positioned adjacent to the battery containment structures 950 and are generally configured to provide cooling to the battery containment structures 950.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A battery coolant reservoir assembly, comprising:
an exterior structure having an interior surface defining an interior space;
a flexible coolant retaining pouch coupled to a manifold, wherein the manifold includes a plurality of ports for connecting to coolant inlet and outlet lines and wherein at least one battery wire port is disposed therein; and
a battery module disposed within the coolant retaining pouch, the coolant retaining pouch being disposed in the interior space of the exterior structure.

2. The battery coolant reservoir assembly of claim 1, wherein the coolant retaining pouch includes a multi-layer liner.

3. The battery coolant reservoir assembly of claim 2, wherein the multi-layer liner includes an interior layer of polyethylene (PE), an outside layer of polyethylene terephthalate (PET), and a nylon layer and an aluminum layer disposed between the interior layer and the outside layer.

4. The battery coolant reservoir assembly of claim 1, further comprising a pair of coolant channeling panels, each of the coolant channeling panels having one or more coolant channels for channeling coolant fluid.

5. The battery coolant reservoir assembly of claim 4, wherein one of the pair of coolant channeling panels is disposed atop the battery module, and one of the pair of coolant channeling panels is disposed below the battery module, within the coolant retaining pouch.

6. The battery coolant reservoir assembly of claim 5, further comprising a coolant liquid circulating within the coolant retaining pouch.

7. The battery coolant reservoir assembly of claim 6, wherein the coolant liquid is a dielectric liquid.

8. A battery system, comprising:
a battery containment structure defining an interior space; and
a plurality of battery coolant reservoir assemblies disposed in the interior space of the battery containment structure, each of the battery coolant reservoir assemblies including:
an exterior structure having an interior surface which defines an interior space; and
a flexible coolant retaining pouch holding one or more battery modules, the coolant retaining pouch being inserted in the interior space of the exterior structure, the coolant retraining pouch being coupled to a manifold having therein a plurality of ports for use in connection to coolant inlet and outlet lines, and the manifold including a battery terminal,
wherein the plurality of battery coolant reservoir assemblies is interconnected via coolant connecting lines.

9. The battery system of claim 8 wherein the flexible coolant retaining pouch comprises a plurality of layers.

10. The battery system of claim 9 wherein the plurality of layers includes:
a first layer comprising polyethylene;
a second layer comprising nylon;
a third layer comprising aluminum; and
a fourth layer comprising polyethylene terephthalate.

11. The battery system of claim 8 wherein at least some of the battery terminals of the plurality of coolant reservoir assemblies are electrically coupled via battery wires.

12. The battery system of claim 8 wherein the one or more battery modules includes a plurality of battery cells spaced apart to define voids, and a plurality of fillers, the fillers positioned in the voids.

13. The battery system of claim 8 wherein the manifold includes a plurality of ports for connecting to coolant inlet and outlet lines.

* * * * *